United States Patent [19]

Garde

[11] Patent Number: 5,611,075
[45] Date of Patent: Mar. 11, 1997

[54] BUS ARCHITECTURE FOR DIGITAL SIGNAL PROCESSOR ALLOWING TIME MULTIPLEXED ACCESS TO MEMORY BANKS

[75] Inventor: Douglas Garde, Dover, Mass.

[73] Assignee: Analog Devices, Inc., Norwood, Mass.

[21] Appl. No.: 681,905

[22] Filed: Jul. 29, 1996

Related U.S. Application Data

[63] Continuation of Ser. No. 317,891, Oct. 4, 1994, abandoned.

[51] Int. Cl.[6] .................................................. G06F 13/00
[52] U.S. Cl. ................... 395/480; 364/244.8; 364/243.6; 364/243; 364/DIG. 1
[58] Field of Search ..................................... 395/480, 800

[56] References Cited

U.S. PATENT DOCUMENTS

| | | | |
|---|---|---|---|
| 4,164,787 | 8/1979 | Aranguren | 395/800 |
| 4,439,839 | 3/1984 | Kneib | 395/800 |
| 4,809,217 | 2/1989 | Floro | 395/281 |
| 4,933,846 | 6/1990 | Humphrey | 395/700 |
| 4,939,638 | 7/1990 | Stephenson | 395/375 |
| 5,009,417 | 3/1992 | Magar et al. | 395/425 |
| 5,317,572 | 5/1994 | Satoh | 370/105.1 |
| 5,396,608 | 3/1995 | Garde | 395/400 |

FOREIGN PATENT DOCUMENTS

| | | |
|---|---|---|
| 0427407 | 5/1991 | European Pat. Off. . |
| 0537072 | 4/1993 | European Pat. Off. . |
| 0540206 | 5/1993 | European Pat. Off. . |
| 0560020 | 9/1993 | European Pat. Off. . |
| WO90/07154 | 6/1990 | WIPO . |

OTHER PUBLICATIONS

B. Schweber, S. Cox, D. Garde, Analog Dialogue, vol. 28, No. 3, 1994, pp. 3–5.

T. Cantrell, The Computer Applications Journal, Issue #45, Apr. 1995, pp. 62–67.

T. Costlow, "MIT Building 64–Processor Parallel DSP System", EE Times, Feb. 14, 1994, one sheet.

L. Gwennap, "SHARC: A Bold New DSP Thrust by Analog", Microprocesor Report, Dec. 6, 1993, two sheets.

D. Garde and M. Valley, "A 120 MFLOP Digital Signal Processor for Multi–Processing Applications", GOMAC, Nov. 1993, pp. 67–70.

N. Stam, "Looking Inside The Power PC 601", PC Magazine, Feb. 22, 1994, p. 199 (three sheets).

J. E. Brewer et al, "A monolithic Processing Subsystem", IEEE Trans. On Components, Pack. & Manuf. Tech., Part B, vol. 17, No. 3, pp. 310–316, Aug. 1994.

J. E. Brewer et al, "A Single–Chip Digital Signal Processing Subsystem", 1994 Proceedings, Sixth Annual IEEE (ICWSI), San Franciso, CA, pp. 265–272, Jan. 1994.

(List continued on next page.)

*Primary Examiner*—Eric Coleman
*Attorney, Agent, or Firm*—Wolf, Greenfield & Sacks, P.C.

[57] ABSTRACT

A monolithic digital signal processor includes a core processor for performing digital signal computations, an I/O processor for controlling external access to and from the digital signal processor through an external port, first and second memory banks for storing instructions and data for the digital signal computations, and first and second buses interconnecting the core processor, the I/O processor and the memory banks. The core processor and the I/O processor access the memory banks on the first bus without interference on different clock phases of a clock cycle. The internal memory and the I/O processor of the digital signal processor are assigned to a region of a global memory space, which facilitates multiprocessing configurations. In a multiprocessor system, each digital signal processor is assigned a processor ID. The digital signal processor includes a bus arbitration circuit for controlling access to an external bus through the external port. The digital signal processor may include one or more serial ports and one or more link ports for point-to-point communication with external devices. A DMA controller controls DMA transfers through the external port, the serial ports and the link ports.

5 Claims, 13 Drawing Sheets

OTHER PUBLICATIONS

IBM Technical Disclosure Bulletin, vol. 33, No. 10A, Mar. 1991, New York, pp. 1–5 "Distributed Process Bulletin Board".

"MVP: The dawn of a new era in digital signal processing—Introducing TM5320C8X", Texas Instruments notes, data unknown.

C. P. Feigel, "TI Introduces Four–Processor DSP Chip", Microprocessor Report, Mar. 28, 1994, pp. 22–25.

P. Papamichalis et al, "The TMS320C30 Floating–Point Digital Signal Processor", IEEE Micro, Dec. 1988, pp. 13–29.

M. L. Fuccio et al, "The DSP32C: AT&T's Second–Generation Floating–Point Digital Signal Processor", IEEE Micro, Dec. 1988, pp. 30–48.

G. R. L. Sohie et al, "A Digital Signal Processor with IEEE Floating Point Arithmetic", IEEE Micro, Dec. 1988, pp. 49–67.

Simar, Jr R et al, "Floating–Point Processors Join Forces In Parallel Processing Architectures", IEEE MICRO, vol. 12, No. 4, 1 Aug. 1992, pp. 60–69.

Bedu J Y, "Les DSPS Analog Devices (2)", Electronique Radio Plans, No. 545, 1 Apr. 1993, pp. 57–64.

Weiss, R, "DSP Tools: Navigating the Hardware/Software Interface", Computer Design, vol. 33, No. 11, 1 Oct. 1994 pp. 69–70, 72, 74, 76, 78, 80, 82, 84.

BUS ARCHITECTURE FOR DIGITAL SIGNAL PROCESSOR ALLOWING TIME MULTIPLEXED ACCESS TO MEMORY BANKS

This application is a continuation of application Ser. No. 08/317,891, filed Oct. 4, 1994, now abandoned.

FIELD OF THE INVENTION

This invention relates to digital signal processors and, more particularly, to an internal bus architecture for a monolithic digital signal processor.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing and speech recognition. Digital signal processor applications are characterized by real time operation, high interrupt rates and intensive numeric computations. In addition, digital signal processor applications tend to be intensive in memory access operations and require the input and output of large quantities of data. Thus, designs of digital signal processors may be quite different from those of general purpose processors.

One approach that has been used in the architecture of digital signal processors is the Harvard architecture, which utilizes separate, independent program and data memories so that the two memories may be accessed simultaneously.

Although the Harvard architecture provides acceptable performance, the need exists for further enhancements to the performance of digital signal processors. In particular, the need exists for increased computation rates, improved direct memory access (DMA) operation and multiprocessor configurations. Additional desirable features include increased integration of peripheral circuitry into the digital signal processing chip, so that the overall cost and complexity of the system is reduced.

SUMMARY OF THE INVENTION

According to the present invention, a digital signal processor comprises a core processor for performing digital signal computations, an I/O processor for controlling external access to and from the digital signal processor, first and second memory banks for storing instructions and data for the digital signal computations, and a first bus and a second bus interconnecting the core processor and the first and second memory banks. The first bus also interconnects the I/O processor and the first and second memory banks. The digital signal processor further comprises a clock circuit for generating a first clock phase and a second clock phase in response to a clock signal, and means for coupling the core processor to one of the memory banks on the first bus during the second clock phase and for coupling the I/O processor to one of the memory banks on the first bus during the first clock phase. The core processor and the I/O processor can access the first and second memory banks on the first bus on different clock phases of a clock cycle.

The means for coupling may further include means for coupling the core processor to the other of the memory banks on the second bus during the second clock phase. As a result, the core processor can simultaneously access the first and second memory banks during the second clock phase.

The digital signal processor may further include an external port bus interconnecting the core processor and the I/O processor, and an external port circuit for interconnecting the external port bus to an external bus. The external bus provides interconnection to one or more external devices. The I/O processor may include means for coupling data between the external port bus and the memory banks on the first bus during the first clock phase. As a result, the external device can access the memory banks without interfering with operation of the core processor.

The I/O processor may include a data communication port and means for coupling data between the data communication port and the memory banks on the first bus during the first clock phase. As a result, the data communication port can access the memory banks without interfering with operation of the core processor.

According to another aspect of the invention, a digital signal processor comprises a core processor, an I/O processor, first and second memory banks, and a first bus and a second bus interconnecting the core processor and the first and second memory banks. The first bus also interconnects the I/O processor and the first and second memory banks. The digital signal processor further comprises an external port bus interconnecting the core processor and the I/O processor, and an external port circuit for interconnecting the external port bus to an external bus. The external bus provides interconnection to an external device. The I/O processor can communicate with the external device on the external port bus without interfering with access by the core processor to the first and second memory banks on the first bus and the second bus.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
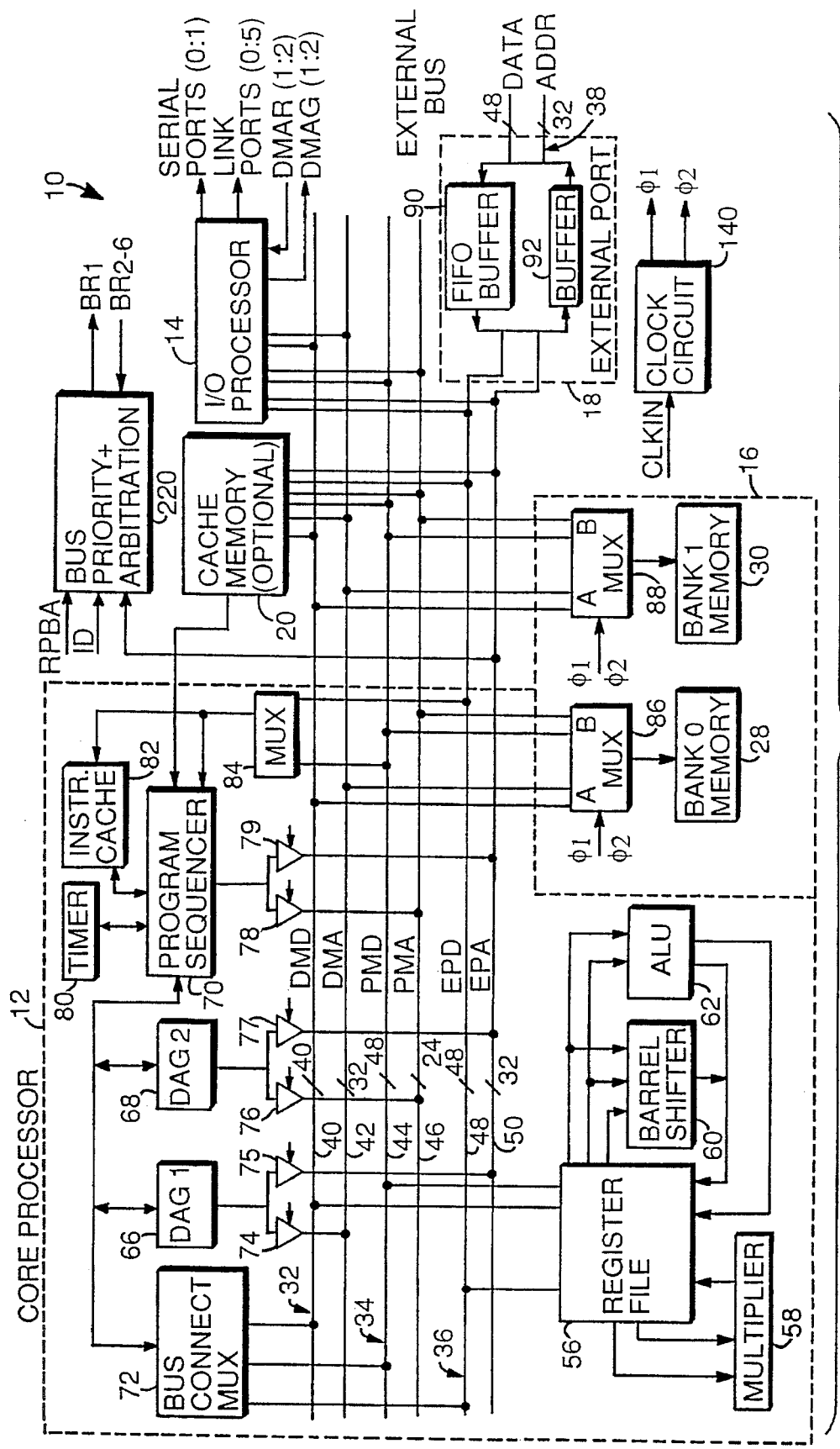
FIG. 1 is a block diagram of a digital signal processor in accordance with the present invention.

A block diagram of a digital signal processor (DSP) 10 in accordance with the present invention is shown in FIG. 1.

The principal components of DSP 10 are a core processor 12, an I/O processor 14, a memory 16 and an external port 18. The DSP 10 may also include an optional cache memory 20. The core processor 12 performs the main computation and data processing functions of the DSP 10. The I/O processor 14 controls external communications via external port 18, one or more serial ports and one or more link ports.

The DSP 10 is configured as a single monolithic integrated circuit. In a preferred embodiment, the memory 16 has a capacity of 4 megabits, structured in two banks of 2 megabits each. In other versions, the DSP 10 may have 0.5, 1.0 or 2.0 megabits, or may have more than 4 megabits. The DSP 10 is preferably fabricated using a bulk CMOS process with 0.5 micron gate length, self-aligned polysilicon and two layer metallization.

The memory 16 includes two independent, large capacity memory banks 28 and 30 in a modified Harvard architecture configuration. A data memory (DM) bus 32 interconnects the core processor 12, I/O processor 14, memory 16 and cache memory 20. A program memory (PM) bus 34 likewise interconnects core processor 12, I/O processor 14, memory 16 and cache memory 20. An external port (EP) bus 36 interconnects core processor 12, I/O processor 14, cache memory 20 and external port 18. The external port 18 connects EP bus 36 to an external bus 38. The operation of the DM bus 32, the PM bus 34 and the EP bus 36 for high performance digital signal processing is discussed in detail below. As shown in FIG. 1, each of the buses 32, 34 and 36 includes a data bus and an address bus. Thus, DM bus 32 includes a DMD bus 40 (data) and a DMA bus 42 (address); PM bus 34 includes a PMD bus 44 (data) and a PMA bus 46 (address); and EP bus 36 includes an EPD bus 48 (data) and an EPA bus 50 (address). Each of the buses includes multiple lines for parallel transfer of binary information. In an example of the digital signal processor, the DMD bus 40 has 40 lines, the DMA bus 42 has 32 lines, the PMD bus 44 has 48 lines, the PMA bus 46 has 24 lines, the EPD bus 48 has 48 lines and the EPA bus 50 has 32 lines.

The core processor 12 includes a data register file 56 connected to DMD bus 40, PMD bus 44 and EPD bus 48. The data register file 56 is connected in parallel to a multiplier 58, a barrel shifter 60 and an arithmetic logic unit (ALU) 62. The multiplier 58, barrel shifter 60 and ALU 62 all perform single cycle instructions. The parallel configuration maximizes computational throughput. Single, multi-function instructions execute parallel ALU and multiplier operations. The computation units support IEEE 32-bit single precision floating point, extended precision 40-bit floating point, and 32-bit fixed point data formats. The data register file 56 is used for transferring data between the computation units and data buses and for storing intermediate results. In a preferred embodiment, the register file 56 contains 32 registers, 16 primary and 16 secondary.

The core processor 12 further includes a first data address generator (DAG1) 66, a second data address generator (DAG2) 68 and a program sequencer 70. A bus connect multiplexer 72 receives inputs from DMD bus 40, PMD bus 44 and EPD bus 48 and supplies bus data to data address generators 66 and 68 and to program sequencer 70. The data address generator 66 supplies addresses through a tri-state device 74 to DMA bus 42 or through a tri-state device 75 to EPA bus 50. The data address generator 68 supplies addresses through a tri-state device 76 to PMA bus 46 or through a tri-state device 77 to EPA bus 50. Program sequencer 70 supplies addresses through a tri-state device 78 to PMA bus 46 or through a tri-state device 79 to EPA bus 50. The data address generators 66 and 68 implement circular data buffers in hardware. Circular buffers allow efficient implementation of delay lines and other data structures required in digital signal processing, and are commonly used in digital filters and Fourier transforms. The data address generators 66 and 68 contain sufficient registers to allow the creation of up to 32 circular buffers (16 primary register sets, 16 secondary register sets). The data address generators automatically handle address pointer wrap-around. The circular buffers can start and end at any memory location.

The core processor 12 further includes an instruction cache 82 connected to the program sequencer 70. A multiplexer 84 connected to the PMD bus 44 and to the EPD bus 48 supplies instructions to the instruction cache 82 and to the program sequencer 70. The instruction cache 82 enables three bus operation for fetching an instruction and two data values. The instruction cache 82 is selective in that only the instructions whose fetches conflict with PMD bus 44 data accesses are cached. This allows full speed execution of core looped operations, such as digital filter multiply-accumulates and FFT butterfly processing. The core processor 12 further includes an interval timer 80 connected to the program sequencer 70. The optional cache memory 20 is connected to the program sequencer 70 for fetching instructions.

The DSP 10 utilizes an enhanced Harvard architecture in which the DM bus 32 transfers data, and the PM bus 34 transfers both instructions and data. With separate program and data memory buses and the on-chip instruction cache 82, the core processor 12 can simultaneously fetch two operands (from memory banks 28 and 30) and an instruction (from cache 82), all in a single cycle. The architecture of the core processor 12 is based on the architecture of the core processor in the ADSP-21020 and ADSP-21010 digital signal processors manufactured and sold by Analog Devices, Inc.

The memory 16 preferably contains four megabits of static random access memory (SRAM) organized as memory banks 28 and 30, each having two megabits. The memory banks 28 and 30 can be configured for different combinations of program and data storage. As described below, each bank is effectively dual ported for single cycle independent accesses by the core processor 12 and the I/O processor 14. A multiplexer 86 selectively connects memory bank 28 to DM bus 32 or to PM bus 34. A multiplexer 88 selectively connects memory bank 30 to DM bus 32 or to PM bus 34. Control of the multiplexers 86 and 88 on different clock phases to provide time-multiplexed bus operation and memory access is described below. The dual port memory and the separate on-chip buses 32 and 34 allow two data transfers from the core processor 12 and one from the I/O processor 14, all in a single cycle. The memory 16 can be configured as a maximum of 128K words of 32-bit data, 256K words of 16-bit data, 80K words of 48-bit instructions (and 40-bit data), or combinations of different word sizes up to 4 megabits. The memory can be accessed as 16-bit, 32-bit or 48-bit words. Techniques for accessing variable length words in a memory array are disclosed in pending application Ser. No. 08/083,619 now U.S. Pat. No. 5,396,608, filed Jun. 28, 1993, which is hereby incorporated by reference. The large on-chip memory capacity of the DSP has the advantage of significantly reducing traffic on the external bus, thereby facilitating use of the DSP in multiprocessor systems. In alternative embodiments, the DSP 10 can have more than two memory banks.

While each of the memory banks 28 and 30 can store combinations of instructions and data, on-chip memory accesses are most efficient when one block stores data, using the DM bus 32 for transfers, and the other block stores instructions and data, using PM bus 34 for transfers. Use of the DM bus 32 and the PM bus 34 in this way, with one bus dedicated to each memory block, assures single cycle execution with two data transfers. In this case, the instruction must be available in the instruction cache 82. Single cycle execution is also maintained when one of the data operands is transferred to or from an external device through the external port 18. The external port 18 provides the interface for the DSP 10 to off-chip memory and peripherals. A 4 gigaword external address space is included in the global address space of the DSP 10, as described below.

The external port 18 includes a FIFO buffer 90 connected between the EP bus 36 and the external bus 38. The FIFO buffer 90 is used for input operations to the DSP 10 and, in particular, is used during write operations when the DSP is a bus slave. The FIFO buffer 90 has a four-deep configuration for asynchronous operations and a two-deep configuration for synchronous operations. A buffer 92, connected between the EP bus 36 and the external bus 38, is used for output operations from the DSP 10 to the external bus. In a preferred embodiment, the external bus has 48 data lines and 32 address lines.

Figure 2:
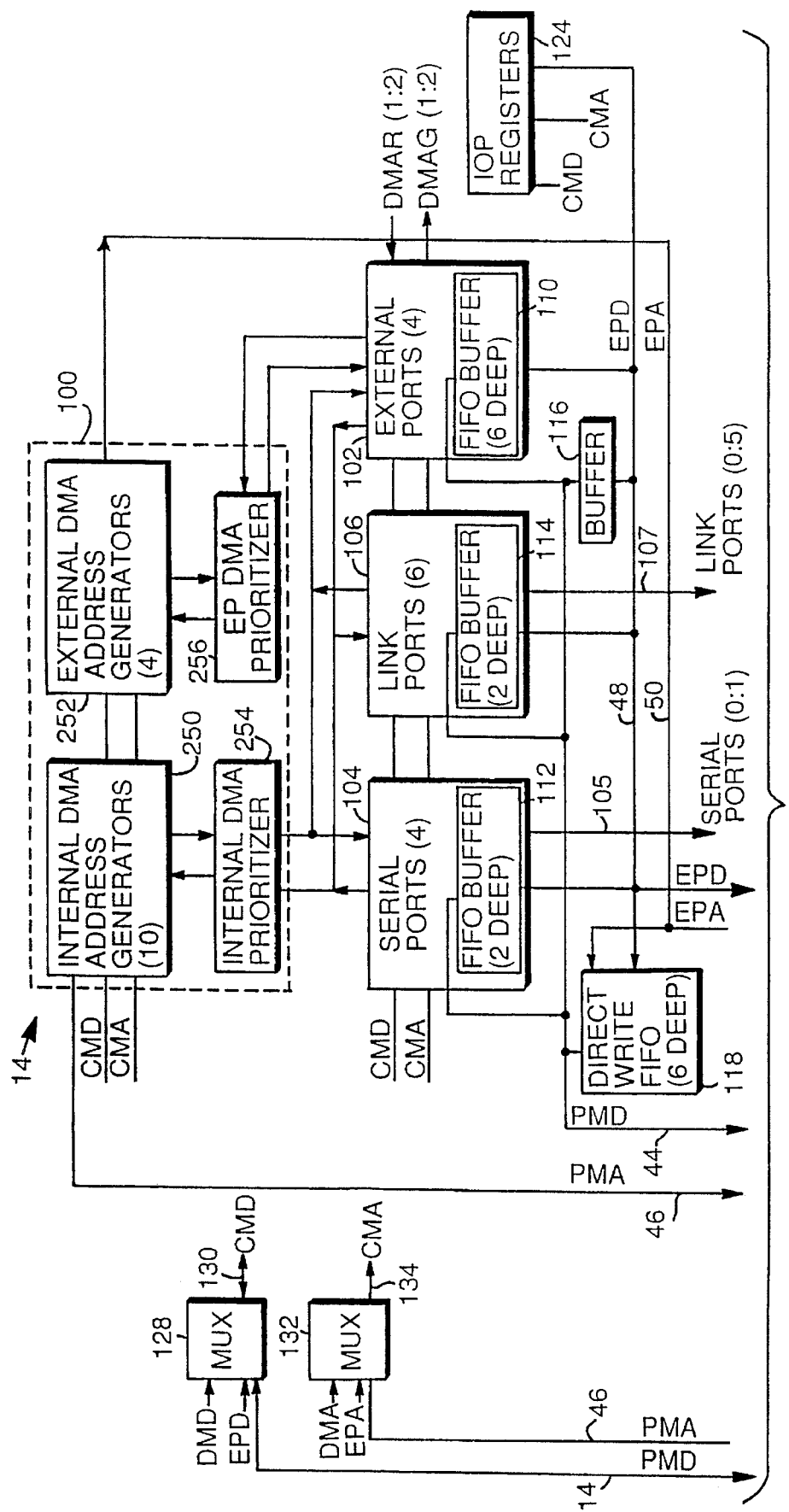
FIG. 2 is a block diagram of the I/O processor of FIG. 1.

A block diagram of the I/O processor 14 is shown in FIG. 2. A DMA controller 100 controls DMA transfers between memory 16 and external memory, external peripherals or a host processor via an external port circuit 102 and external port 18. The DMA controller 100 also controls DMA transfers between memory 16 through serial ports 105 or link ports 107. The external port circuit 102 contains circuitry, including a FIFO buffer 110 for DMA transfer through external port 18. A serial port circuit 104 contains circuitry, including a FIFO buffer 112, for communication through one or more synchronous serial ports 105. A link port circuit 106 contains circuitry, including a FIFO buffer 114, for transfer of data through one or more four-bit link ports 107. Each of the FIFO buffers 110, 112 and 114 is connected between the EPD bus 48 and the PMD bus 44. A buffer 116 is also connected between EPD bus 48 and PMD bus 44 for transfers between these buses. The I/O processor further includes a direct write FIFO 118 connected between the EPD bus 48 and the PMD bus 44.

The I/O processor 14 includes IOP registers 124, which are a set of memory-mapped control and data registers. The IOP registers 124 contain information for configuring system level functions, internal memory word width and I/O operation, including DMA, serial port and link ports. The IOP registers 124 are programmed by writing to the appropriate address in memory. The memory-mapped IOP registers can be accessed by an external device that is bus master, either another DSP or a host processor. This allows, for example, an external device to setup a DMA transfer to the internal memory of the DSP 10 without intervention by the core processor.

A multiplexer 128 selects the DMD bus 40, the PMD bus 44 or the EPD bus 48 for connection to a local CMD bus 130. A multiplexer 132 selects the DMA bus 42, the PMA bus 46 or the EPA bus 50 for connection to a local CMA bus 134. The CMD bus 130 and the CMA bus 134 are used within the I/O processor 14 for reading and writing all registers from the core processor or from the host. As shown in FIG. 2, the CMD bus 130 and the CMA bus 134 are connected to the DMA controller 100, external port circuit 102, serial port circuit 104, link port circuit 106 and IOP registers 124.

The configuration of the DSP 10 shown in FIG. 1 and described above permits high performance digital signal processing. The memory 16 is configured as a pipelined memory so as to permit separate memory accesses on different clock phases. The DSP 10 includes a clock circuit 140 which receives an input clock signal CLKIN, typically having a frequency of 40 MHz, and outputs a first clock phase $\phi_1$ and a second clock phase $\phi_2$. Each clock cycle is thus divided into two phases. Alternatively, the clock circuit can generate more than two clock phases using, for example, a tapped delay line. The multiplexers 86 and 88 are controlled by the clock phases such that different address and data buses can be selected on each clock phase. Thus, for example, the multiplexer 86 may select the PM bus 34 for connection to memory bank 28 during the first clock phase and may select the DM bus 32 for connection to memory bank 28 during the second clock phase. This permits two separate and independent accesses to memory bank 28 during a single clock cycle. The multiplexer 88 and memory bank 30 operate in the same manner. The structure and operation of a pipelined memory are described in pending application Ser. No. 08/215,508, filed Mar. 22, 1994, which is hereby incorporated by reference.

Further in accordance with the invention, the PM bus 34 is time-shared to permit independent and concurrent access to memory 16 by the core processor 12 and the I/O processor 14. In particular, the core processor accesses the memory 16 on the PM bus 34 during the second clock phase of each clock cycle, and the I/O processor 14 accesses memory 16 on the PM bus 34 during the first clock phase of each clock cycle. Note that the read or write corresponds to the address that was supplied one cycle earlier, i.e., the access is pipelined. During the second clock phase, the core processor 12 controls the DM bus 32 and the PM bus 34, and the I/O processor 14 connections to these buses are tri-stated. During the first clock phase, the I/O processor 14 controls the PM bus 34, and the core processor 12 connections to this bus are tri-stated. For example, the data address generator 66 may provide an address on DMA bus 42, and the data address generator 68 or the program sequencer 70 may provide a second address on the DMA bus 46 simultaneously. During the second clock phase, multiplexer 86 selects PMA bus 42 to access the location in memory bank 28 specified by data address generator 66. During the same second clock phase, multiplexer 88 selects PMA bus 46 to access the location in memory bank 30 that is specified by data address generator 68 or program sequencer 70. Thus, the core processor 12 simultaneously accesses locations in memory bank 28 and memory bank 30 during the second clock phase. During the first clock phase, the I/O processor 14 supplies an address on PMA bus 46 for accessing either memory bank 28 or memory bank 30. The appropriate multiplexer 86 or 88 selects the PM bus 34 so that the I/O processor 14 may access the desired memory location and read or write at the location accessed in the previous cycle. During the first clock phase, the access to memory 16 by I/O processor 14 may be part of a DMA transfer via external port 18, the serial ports 105 or the link ports 107. Therefore, core processor 12 accesses memory 16 during the second clock phase, and the I/O processor 14 accesses memory 16 during the first clock phase, both via the time multiplexed PM bus 34. Thus, the core processor 12 and the I/O processor 14 can access memory 16 independently and without interference. This permits the core processor 12, for example, to perform computations while the I/O processor 14 controls DMA transfer to or from memory 16. Memory access operations by the core processor 12 and the I/O processor 14 over the DM bus 32 and the PM bus 34 are summarized in Table I below.

TABLE I

Summary of Memory Access Operations

| | Cycle 1 | | Cycle 2 | |
|---|---|---|---|---|
| | $\phi_1$ | $\phi_2$ | $\phi_1$ | $\phi_2$ |
| DM bus 32 | — | Core 12 | — | Core 11 |
| PM bus 34 | IOP 14 | Core 12 | IOP 14 | Core 12 |

The EP bus 36 operates on clock phases, called a first EP clock phase and a second EP clock phase, which are phase shifted with respect to the clock phases used for memory access operations as described above. Multiple clock phases can be generated, for example, by a tapped delay line. In a read from external memory, the read address is placed on the EP address bus 50 during a first EP clock cycle, and the read data is available on the EP data bus 48 during the second EP clock phase of the next EP clock cycle. In a write to external memory, the write address is placed on the EP address bus 50 during a first EP clock cycle, and the data is written onto the EP data bus 48 during the second clock phase of the next EP clock cycle.

The EP bus 36 provides additional advantages in the performance of DSP 10. As discussed previously, the EP bus 36 is connected to the core processor 12 and to the I/O processor 14. External devices can communicate with the I/O processor 14 via the EP bus 36 without any effect on the DM bus 32 or the PM bus 34. Furthermore, external devices can perform DMA transfers to and from memory 16 via the EP bus, I/O processor 14 and the PM bus 34 (during the first clock phase) as described above, without interfering with the operation of the core processor 12. In addition, core processor 12 can access an external device, such as external memory, a host processor or another DSP in a multiprocessor configuration, via the EP bus 36. In general, the EP bus 36 permits communication with external devices and reduces traffic on the DMD bus 32 and the PM bus 34 in comparison with configurations where these buses are used for external communication. In addition, when the DSP 10 includes cache memory 20, the EP bus 36 can be used in conjunction with the DM bus 32 and the PM bus 34 to perform three memory access operations (an instruction and two operands) in one clock cycle. Finally, an external device can access the resources of the I/O processor 14 via external port 18 and EP bus 36 without interfering with the operation of the core processor 12. In alternative embodiments, the DSP 10 can include more than one external port and more than one EP bus.

The independent PM and DM buses allow the core processor 12 to simultaneously access instructions and data from both memory blocks 28 and 30. If the core processor tries to access two words from the same memory block for a single instruction, an extra cycle is needed. Instructions are fetched over the PM bus 34 or from the instruction cache 82. Data can be accessed over both the DM bus 32 using data address generator 66 and the PM bus 34 using data address generator 68. The memory blocks 28 and 30 can be configured to store different combinations of 48-bit instruction words and 32-bit data words. Maximum efficiency, i.e. single cycle execution of dual data instructions, is achieved when one memory block contains a mix of instructions and data, while the other memory block contains data only. This means that for an instruction requiring two data accesses, the PM bus 34 is used to access data from the mixed memory block, the DM bus 32 is used to access data from the data only block and the instruction is available from the instruction cache 82. Another way to implement single cycle dual data instructions is to store one of the data operands in external memory. The other operand can be stored in either on-chip memory block.

In typical DSP applications such as digital filters and FFTs, two data operands must be accessed for some instructions. In a digital filter for example, the filter coefficients can be stored in 32-bit words in the same memory block that contains the 48-bit instructions, while 32-bit data samples are stored in the other memory block. This provides single cycle execution of dual data instructions, with the filter coefficients being accessed by data address generator 68 over the PM bus 34 and the instruction being available from the instruction cache 82.

The 48-bit PMD bus 44 is used to transfer instructions (and data), and the 40-bit DMD bus 40 is used to transfer data. The PMD bus 44 is preferably 48 bits wide to accommodate 48-bit instructions. When this bus is used to transfer 32-bit floating point or 32-bit fixed point data, the data is aligned to the upper 32 bits of the bus.

The 40-bit DMD bus 40 provides a path for the contents of any register in the processor to be transferred to any other register or to any other external memory location in a single cycle. Data addresses come from one of two sources: an absolute value specified in the instruction (direct addressing), or the output of a data address generator (indirect addressing). 32-bit fixed point and 32-bit single precision floating point data is also aligned to the upper 32 bits of the DMD bus 40.

Normally the core processor 12 fetches instructions over the PMD bus 44. However, when the processor executes a dual data instruction that requires data to be read or written over the PM bus, there is a conflict for use of the PMD bus 44. The on-chip instruction cache 82 can resolve this conflict by providing the instruction after it is stored in the cache the first time it is executed. By providing the instruction, the cache 82 lets the core processor 12 access data over the PM bus 34. The core processor fetches the instruction from the cache 82 instead of from memory, so that the processor can simultaneously transfer data over the PM bus. Only the instructions which eliminate conflicts with PM bus data accesses are cached. Because of pipelining, an instruction two cycles ahead of the cycle that caused a conflict is stored in cache 82. The instruction cache 82 allows the data to be accessed over the PM bus 34 without any extra cycles whenever the instruction to be fetched is already cached. An extra cycle will occur in the event of a cache miss, even if the instruction and data are in different memory blocks.

Figure 3:
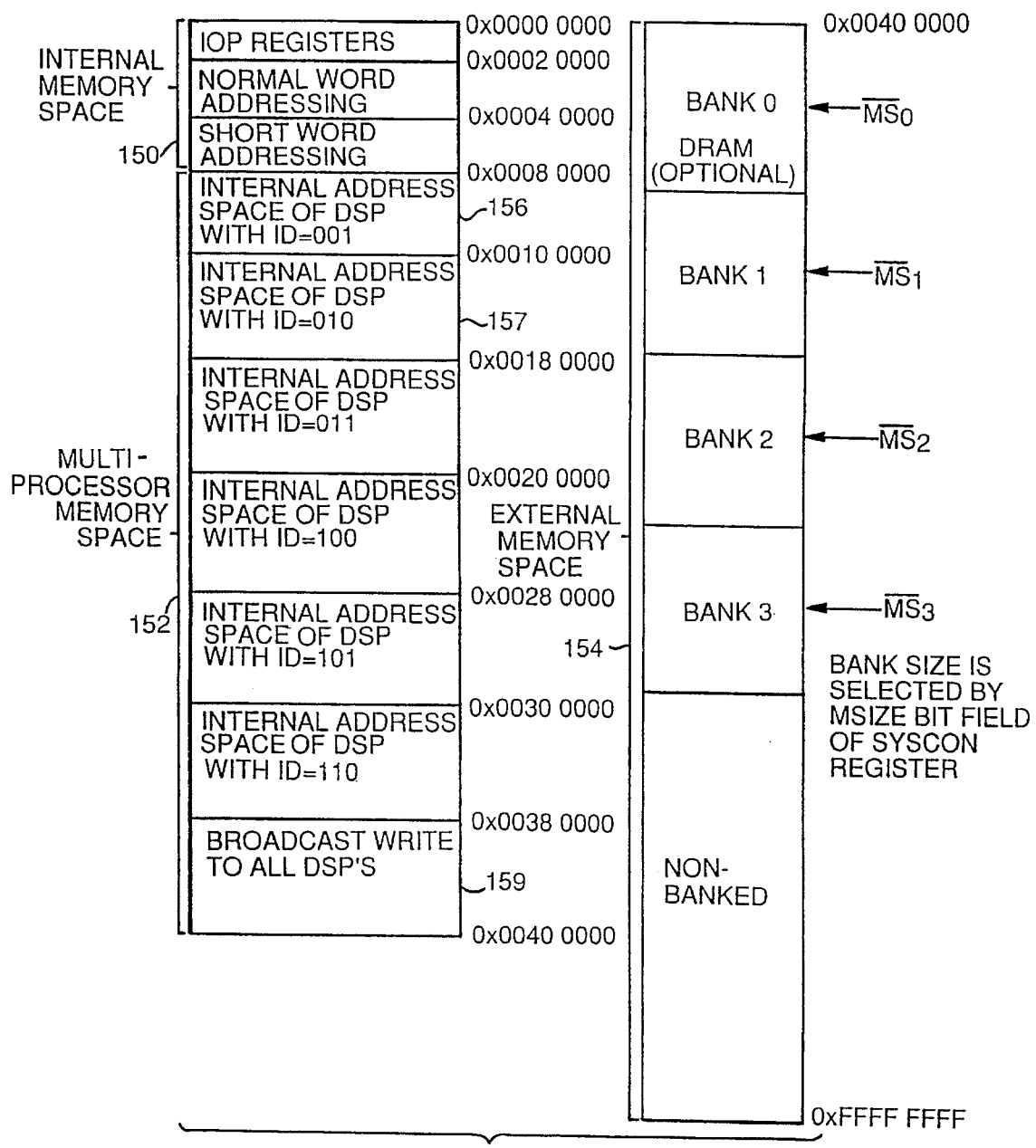
FIG. 3 illustrates the memory map of the digital signal processor.

A memory map of the DSP 10 is shown in FIG. 3. The memory map is divided into three sections: internal memory space 150, multiprocessor memory space 152, and external memory space 154. Internal memory space 150 includes the on-chip memory and resources of the DSP 10. Multiprocessor memory space 152 corresponds to the on-chip memory and resources of other DSP's in a multiprocessor system. External memory space 154 corresponds to off-chip memory and memory mapped I/O devices.

As discussed above, DM bus addresses have 32 bits, and PM bus addresses have 24 bits. Each of the addresses contains an E field (bits 21–31 of DM bus addresses and bits 21–23 of PM bus addresses), an M field (bits 18–20) and an S field (bits 16–17). The I/O processor 14 monitors the addresses of all memory accesses and routes them to the appropriate memory space. The E (external), M (multiprocessing), and S fields are decoded by the I/O processor as shown in Table II below. If the E field is all zeros, the M and S fields become active and are decoded.

TABLE II

| Field | Value | Meaning |
|---|---|---|
| Multiprocessing Address Bits | | |
| E | non-zero | Address in external memory |
|  | all zeros | Address in internal memory or in internal memory of another DSP |
| M | 000 | Address in internal memory |
|  | non-zero | ID of another DSP |
|  | 111 | Broadcast write to internal memory of all DSP's |
| S | 00 | Address of an IOP register |
|  | 01 | Address in normal word addressing space |
|  | 1x | Address in short word addressing space (x = MSB of short word address) |

The internal memory space 150 has three regions: I/O processor registers, normal word addresses and short word addresses. The I/O processor (IOP) registers include 256 memory mapped registers that control the system configuration of the DSP, as well as various I/O operations. Normal word addressing is used for reads and writes of 32-bit or 48-bit words. All instruction fetches and 32-bit or 40-bit data read/writes are accomplished with normal word addresses. 16-bit data read/writes are accomplished with short word addresses.

Multiprocessor memory space 152 maps to the internal memory of other DSP's in a multiprocessor system. This allows each DSP to access the internal memory and memory-mapped IOP registers of the other DSP's. Thus, the I/O processor resources of each DSP can be accessed by other DSP's in the multiprocessor system. The multiprocessor memory space 152 includes regions 156, 157, etc. corresponding to each processor ID and a broadcast write region 159. When the E field of an address is zero and the M field is nonzero, the address falls within the multiprocessor memory space 152. The value of M specifies the processor ID of the external DSP being accessed, and only that processor will respond to the read/write cycle. However, if M=111, a broadcast write is performed to all processors. All of the processors react to this address as if their individual ID was being used, thereby enabling the write to each internal memory.

External memory can be accessed by the core processor 12 and the I/O processor 14 via external port 18. The data address generator 66 and I/O processor 14 generate 32-bit addresses, allowing addressing of the full four gigaword memory map. The program sequencer 70 and data address generator 68 generate 24-bit addresses, limiting addressing to the low 12 megawords from external memory. External memory can be divided into four banks of equal size. Whenever the DSP generates an address located within one of the four banks, the corresponding memory select line, $MS_{3-0}$, is asserted. The memory select lines can be used as chip selects for memories or other external devices, eliminating the need for external decoding logic. The size of the memory banks can range from 8K words to 256 megawords.

Figure 4:
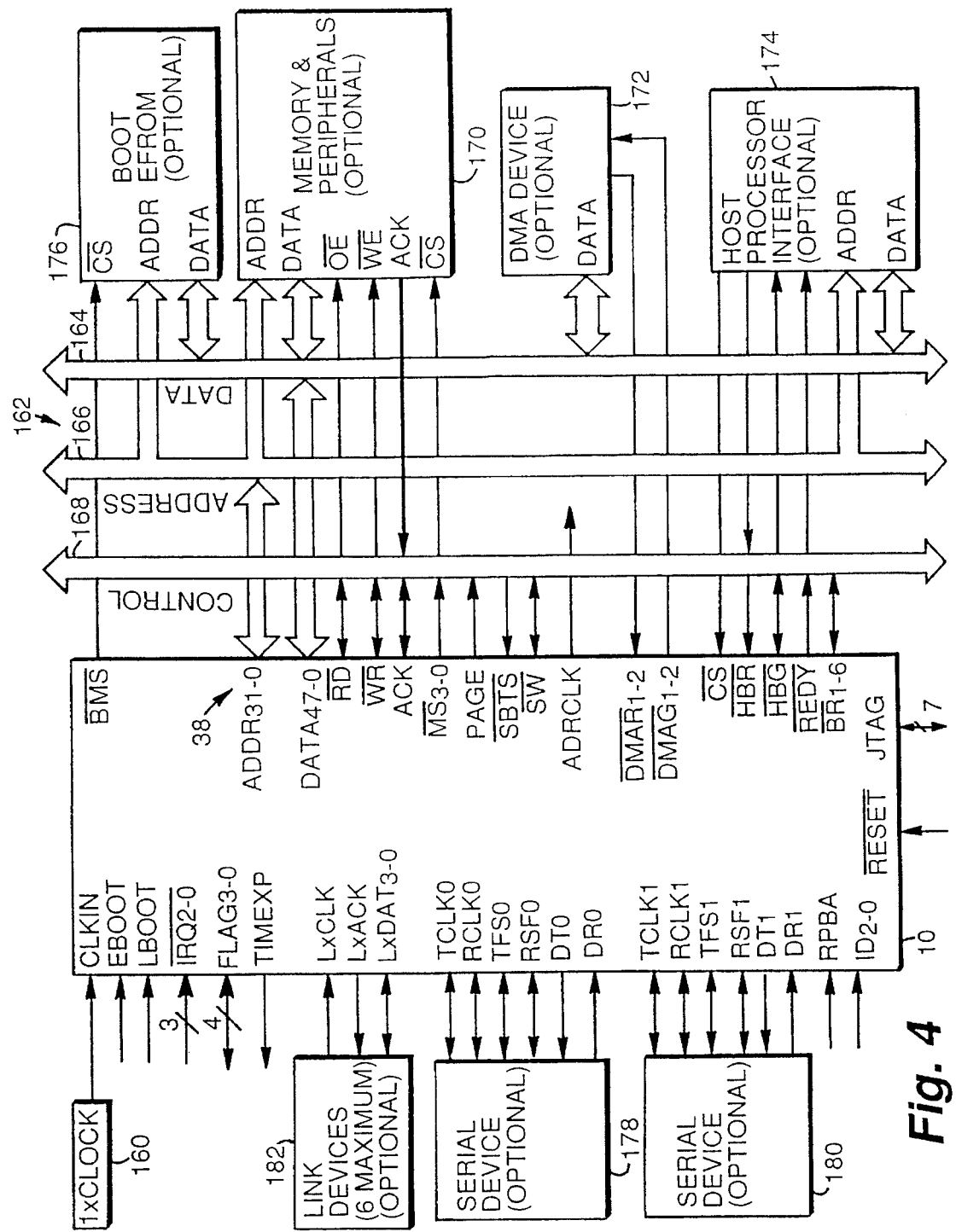
FIG. 4 is a block diagram of a single processor system utilizing the digital signal processor of the present invention.

A single processor system using the DSP 10 is shown in FIG. 4. A clock 160 supplies a clock signal, CLKIN, to the DSP 10. An external bus 162 includes an external data bus 164 and an external address bus 166 connected to the external port 18 (FIG. 1) of DSP 10. A control bus 168 contains control lines for controlling and communicating with external devices. It will be understood that, with the exception of clock 160, the devices shown in FIG. 4 connected to the DSP 10 are optional depending on the desired system configuration. Memory and peripherals 170, a DMA device 172 and a host processor interface 174 may optionally be connected to the external bus 162. The DSP 10 can be booted at system powerup from either a boot PROM 176, a host processor or one of the link ports. In a preferred embodiment, the DSP 10 includes two serial ports for synchronous serial communication with optional serial devices 178 and 180. In addition, the preferred embodiment of the DSP 10 includes six link ports for high speed communication with optional external link devices 182.

Figure 5:
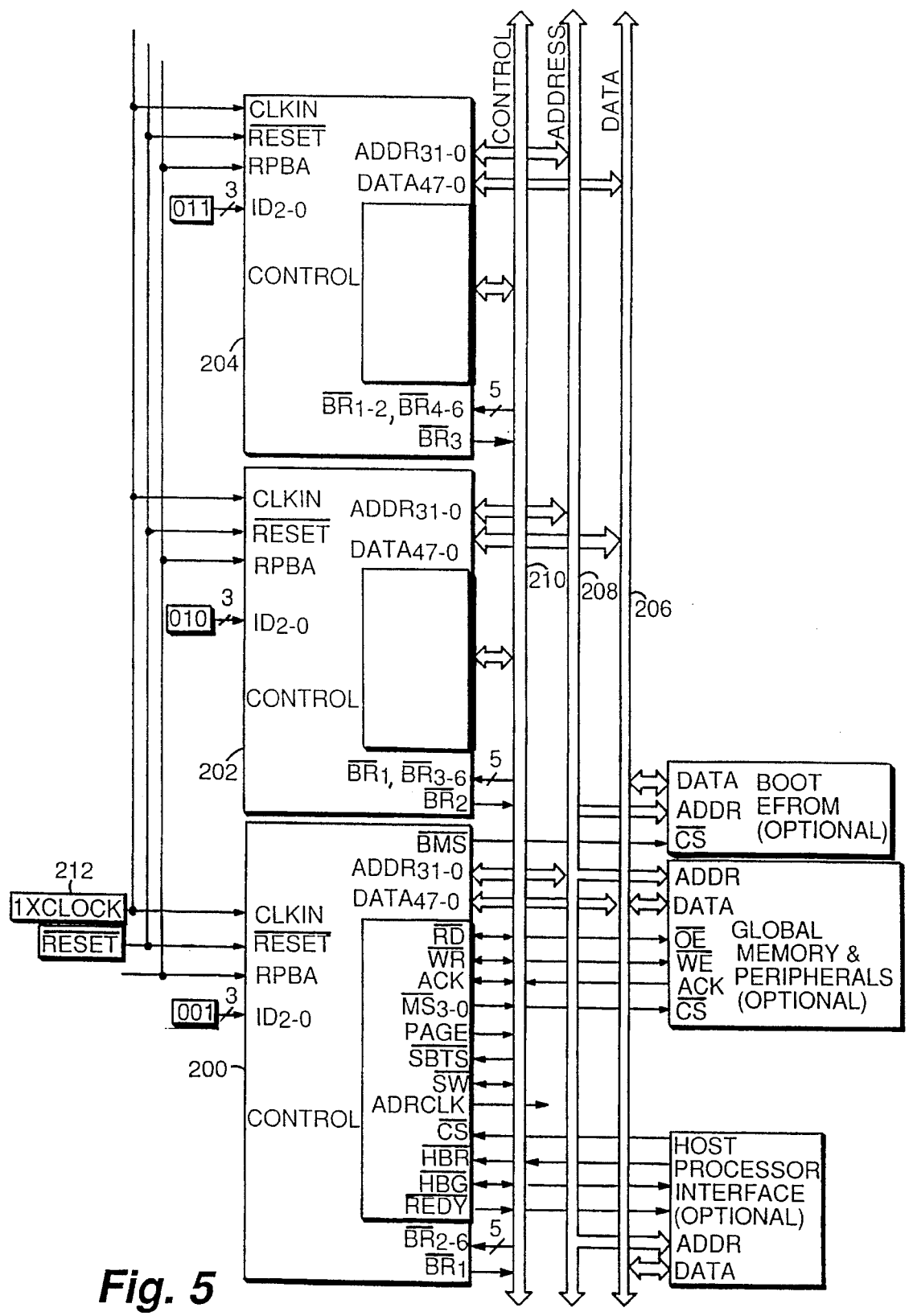
FIG. 5 is a block diagram of a multiprocessor system utilizing the digital signal processor of the present invention.

A multiprocessor system using the DSP 10 is shown in FIG. 5. The multiprocessor system includes DSP's 200, 202 and 204 interconnected by external data bus 206, external address bus 208, and external control bus 210. The data bus 206 and the address bus 208 are connected to external port 18 (FIG. 1) of each DSP. The control bus includes memory read strobe, RD; memory write strobe, WR; memory acknowledge, ACK; memory select lines, $MS_{3-0}$; DRAM page boundary, PAGE; suspend bus three state, SBTS; synchronous write select, SW; address clock, ADRCLK; chip select CS; host bus request, HBR; host bus grant, HBG and host bus acknowledge, REDY. Each of the DSP's 200, 202, and 204 receives a clock signal, CLKIN, from a clock 212. Each of the DSP's 200, 202 and 204 also receives a processor reset signal, RESET, a rotating priority bus arbitration select signal, RPBA, a multiprocessor ID, $ID_{2-0}$, and multiprocessor bus request signals, $BR_{6-1}$.

In the multiprocessor system of FIG. 5 with several DSP's sharing the external bus, one of the DSP's is designated as the bus master. The bus master has control of the external bus including data bus 206, address bus 208 and associated control lines. Each of the DSP's includes an on-chip bus priority and arbitration circuit 220 (FIG. 1). Thus, multiple DSP's can share the external bus with no additional arbitration circuitry. The bus priority and arbitration circuit 220 performs bus arbitration with the use of the bus request signals $BR_1$–$BR_6$, and the host bus request HBR and host bus grant HBG signals. Each DSP only drives its own bus request line, as determined by the value of the ID inputs, and monitors all others. The bus request lines $BR_1$–$BR_6$ arbitrate between multiple DSP's, and the host bus request and host bus grant lines pass control of the external bus between the DSP bus master and the host. The priority scheme for bus arbitration is determined by the state of the rotating priority bus arbitration select line, RPBA. When the RPBA line is high, rotating priority for multiprocessor bus arbitration is selected. When the RPBA line is low, fixed priority is selected. The $ID_{2-0}$ inputs provide a unique identity for each DSP in a multiprocessor system. The first DSP is assigned ID=001, the second is assigned ID=010, etc. In the embodiment of FIG. 5, the processor ID for each DSP is a hard-wired input. In alternative embodiments, the processor ID may be stored in a register and may be under software control.

Each DSP preferably drives the bus request $BR_x$ line (where x represents the bus request line number) corresponding to its processor ID and monitors all others. In an alternative embodiment, the DSP may drive a bus request line that is identified by a separate bus request ID, which may be hard wired or under software control. When one of the slave DSP's needs to become bus master, it automatically initiates the bus arbitration process by asserting its bus request, $BR_x$, line at the beginning of the cycle. Later in the same cycle it samples the values of the other $BR_x$ lines. The cycle in which bus mastership is passed from one DSP to another is called a bus transition cycle. A bus transition cycle occurs when the $BR_x$ line of the current bus master is deasserted and the $BR_x$ line of one of the slaves is asserted. The bus master can retain bus mastership by keeping its $BR_x$ line asserted. The bus master does not always lose bus mastership when it deasserts is $BR_x$ line. Another $BR_x$ line must be asserted by one of the slaves at the same time. In this case, the bus master does not lose any bus cycles. By observing all of the $BR_x$ lines, each DSP can detect when a bus transition cycle occurs and which DSP has become the new bus master. A bus transition cycle is the only time that bus mastership is transferred.

When it is determined that a bus transition cycle will occur, the priority of each $BR_x$ line asserted within that cycle is evaluated in every DSP. The DSP with the highest priority request becomes the bus master on the following cycle, and all of the DSP's update their internal record of the current bus master. The actual transfer of bus mastership is accomplished by the current bus master tri-stating the external bus, including the data bus 166, the address bus 168, and the control signals ADRCLK, RD, WR, $MS_{3-0}$, PAGE, HBG, and DMAG (1:0), at the end of the bus transition cycle and the new bus master driving these lines at the beginning of the next cycle.

Execution of off-chip read/write instructions are delayed during transfers of bus mastership. When one of the slave DSP's needs to perform an off-chip read/write, for example, it automatically initiates the bus arbitration process by asserting its $BR_x$ line. The read/write is delayed until that DSP receives bus mastership. If the read or write was generated by the core processor, program execution stops until the instruction is completed.

Figure 6:
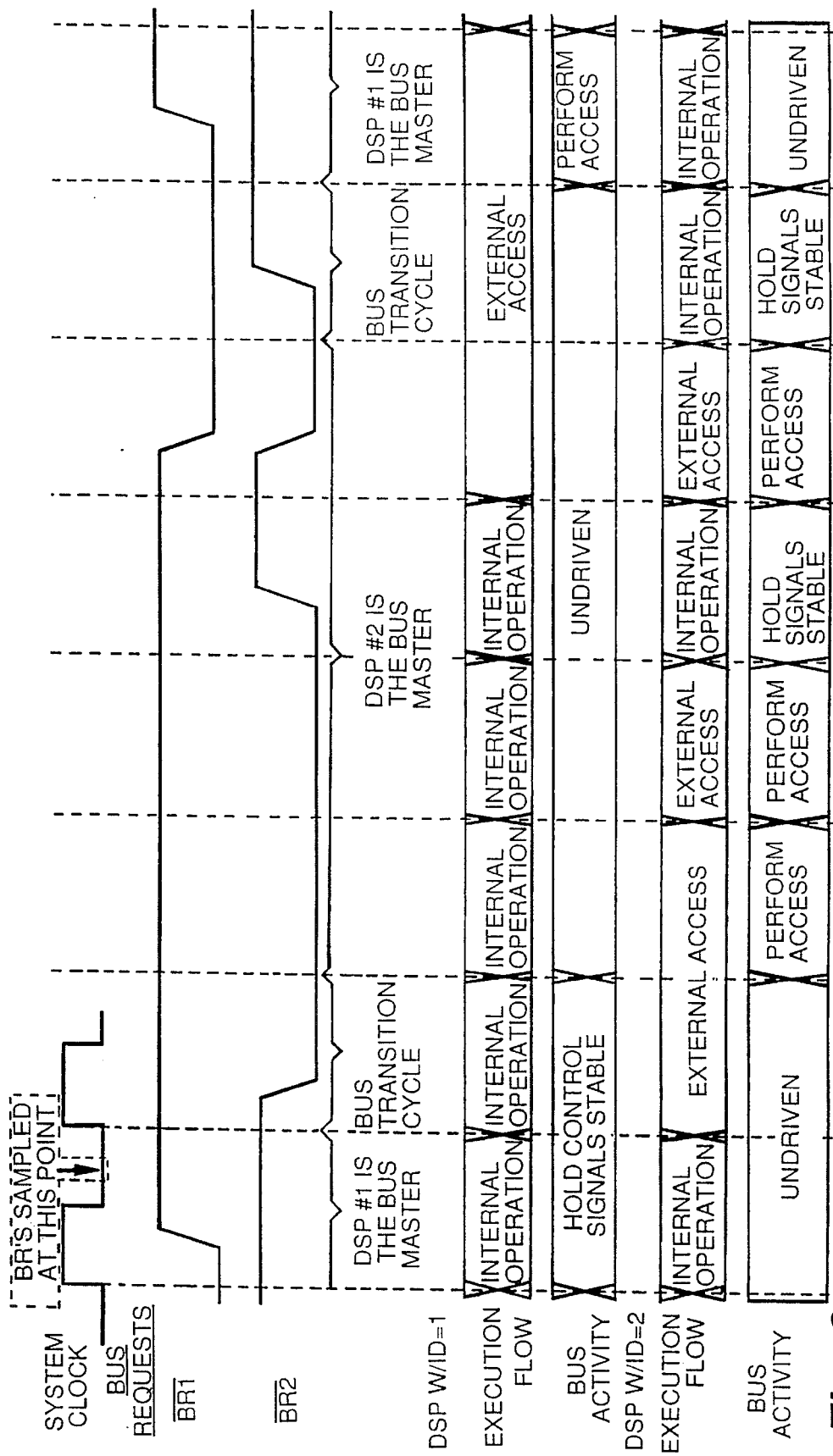
FIG. 6 is a timing diagram that illustrates a bus arbitration timing example in a multiprocessor system.

The following steps summarize the actions a slave DSP takes to perform an off-chip read/write over the external bus: (1) The slave DSP determines that it is executing an instruction which requires an off-chip access. It asserts its $BR_x$ line at the beginning of the cycle. Extra cycles are generated by the core processor or the DMA controller until the slave acquires bus mastership. (2) To acquire bus mastership, the slave DSP waits for a bus transition cycle in which the current bus master deasserts it $BR_x$ line. If the slave has the highest priority request in the bus transition cycle, it becomes the bus master in the next cycle. If not, it continues waiting. (3) At the end of the bus transition cycle, the current bus master releases the bus and the new bus master starts driving the bus. A bus arbitration timing example is shown in FIG. 6.

Two different priority schemes are available to resolve competing bus requests: fixed and rotating. The RPBA line selects which priority scheme is used. In the fixed priority scheme, the DSP with the lowest ID number among the competing bus requests becomes the bus master. The rotating priority scheme gives roughly equal priority to each DSP. When rotating priority is selected, the priority of each processor is reassigned after every transfer of bus mastership. Highest priority is rotated from processor to processor as if they were arranged in a circle. The DSP one place down from the current bus master is the one that receives the highest priority. In either bus arbitration priority scheme, a bus mastership timeout may be utilized. This is accomplished by forcing the bus master to deassert its $BR_x$ line after a specified number of cycles, giving the other DSP's a chance to acquire bus mastership.

In the multiprocessor system of FIG. 5, each DSP can access the internal memory and IOP registers of every other DSP. The master DSP can access the internal memory and IOP registers of a slave DSP simply by reading or writing to the appropriate address in the multiprocessor memory space. Each slave DSP monitors addresses driven on the external bus and responds to any that fall within its region of multiprocessor memory space.

Externally generated accesses of the internal memory of a DSP are called direct reads and direct writes. These accesses are invisible to the core processor, because they are performed through the external port 18 via the I/O processor 14 during the second clock phase of DM bus 32. This is an important feature because it allows the core processor to continue program execution uninterrupted.

When a direct write to a slave DSP occurs, the address and data are latched on-chip by the I/O processor of the slave. The I/O processor buffers the address and data in the six level direct write FIFO buffer 118 (FIG. 2). If additional direct writes are attempted when the FIFO buffer 118 is full, the slave DSP deasserts its acknowledge line, ACK, until the buffer is no longer full. Up to six direct writes can therefore be performed before one is delayed.

When a direct read of a slave DSP occurs, the address is latched on-chip by the I/O processor, and the acknowledge line, ACK, is deasserted. When the corresponding location in memory is read internally, the slave drives the data off-chip and asserts its acknowledge line, ACK. Direct reads are not pipelined.

Broadcast writes allow simultaneous transmission of data to all of the DSP's in a multiprocessor system. The master DSP performs broadcast writes to the same memory location or IOP register in all of the slave DSP's.

Direct memory access (DMA) relieves the core processor 12 of the burden of moving data between memory and an external data source or other memory. The on-chip DMA controller 100 (FIG. 2) allows the core processor 12 or an external device to specify data transfer operations and return to normal processing, while the DMA controller 100 carries out those operations independently from the core processor 12.

As shown in FIG. 2, the DMA controller 100 includes ten internal DMA address generators 250 and four external DMA address generators 252. The address generators 250 and 252 are connected to the CMD bus 130 and the CMA bus 134. The internal DMA address generators 250 are connected to the PMA bus 46, and the external DMA address generators 252 are connected to the EPA bus 50. An internal DMA prioritizer 254 controls priority for the internal DMA address generators 250, and an external DMA prioritizer 256 controls priority for the external DMA address generators 252.

The DMA controller 100 performs two types of operations: block data transfers and I/O autobuffering. Block data transfers occur between internal memory and external memory. The DMA controller is programmed with the buffer size and address, the address increment and the direction of transfer. After programming is complete, DMA transfers begin automatically and continue whenever possible until the entire buffer is transferred.

When performing I/O autobuffering, the same type of buffer is set up in internal memory, but instead of accessing the external memory, the DMA controller 100 accesses the buffer 110 in the external port circuit 102. The direction of data transfer is determined by the direction of the external port. When data is received at the external port circuit 102, it is automatically transferred to internal memory. When the external port circuit 102 needs to transmit a word, the word is automatically fetched from internal memory.

DMA operations can be programmed by the core processor 12 or by an external host processor by writing to the DMA registers in the DMA controller. Up to ten different DMA channels can be programmed at any time.

The DMA system architecture is based on DMA transfers during the first clock phase of the PM bus 34. The serial ports, link ports and external port are connected to the internal memory 16 via the PMD bus 44 during first clock-phase, while the DMA controller generates internal memory addresses on the PMA bus 46 during the first clock phase. The DMA controller 100 is the main controller of data flow to and from the DSP.

The DMA controller 100 preferably contains ten DMA channels, corresponding to the ten internal address generators 250, that are used by the external port, the link ports and the serial ports. Each DMA channel includes a set of registers which implement a buffer in internal memory, and the hardware required to request DMA service. To transfer data, the DMA controller 100 accepts internal requests and sends back internal grants when the requests are serviced. The DMA controller 100 contains prioritizers 254 and 256 to determine which channel can drive the DM bus 32 in any given cycle. The DMA transfer does not conflict with the core processor 12 for internal memory accesses, because the accesses occur on different clock phases as described above.

Figure 7:
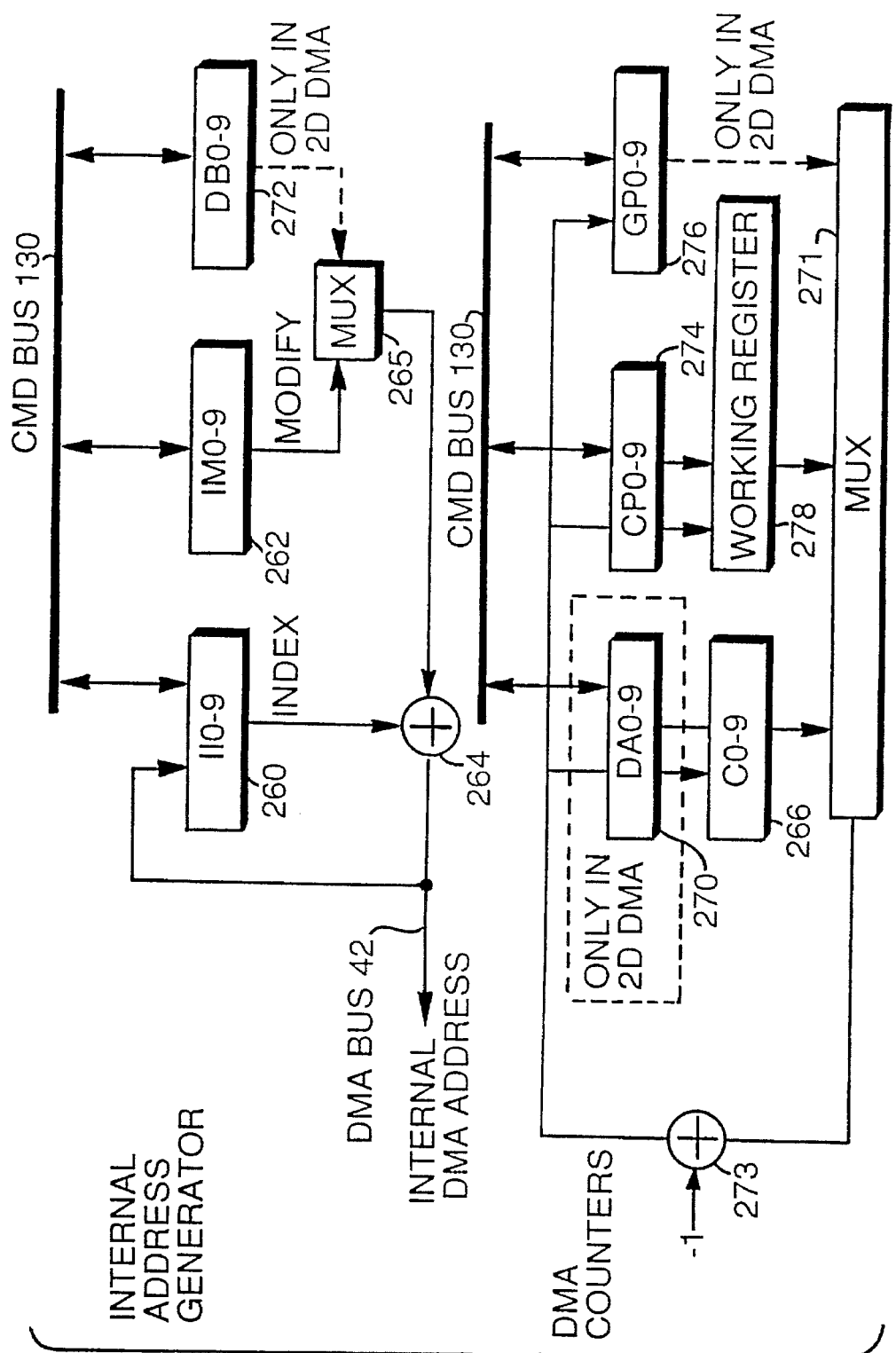
FIG. 7 s a block diagram of the internal DMA address generators of FIG. 2.

The architecture of the internal DMA address generators 250 is shown in FIG. 7. Each internal DMA address generator contains an internal index register 260 and an internal modify register 262, which implement a buffer in internal memory. The index register 260 is output through a summing unit 264 to the DMA bus 42 during the second clock phase of the current DMA cycle. A DMA cycle is defined as a clock cycle in which a DMA transfer is taking place. The modify value from register 262, supplied through a multiplexer 265, is added to the index value in summing unit 264 and is written back to the index register 260 to be used in the next DMA cycle. The modify value in modify register 262 is a signed value to allow incrementing or decrementing of the index register 260.

Each internal DMA address generator also contains a count register 266. When the DMA channel is initialized, the count register 266 is loaded with the number of DMA cycles to be performed by that channel. The count register 266 is decremented after each DMA cycle for that particular channel. When the count reaches 0, the channel is automatically disabled. The count value in register 266 is supplied through a multiplexer 271 to a summing unit 273. The count value is decremented by one in the summing unit 273 and written back to the count register 266 to be used on the next cycle. Each internal DMA address generator 250 further includes a DA register 270 and a DB register 272, which are used for two dimensional array addressing in mesh multiprocessing applications. In addition, each internal DMA address generator includes a chain pointer register 274 and a general purpose register 276. The registers 260, 262, 272, 270, 274 and 276 are connected to the CMD bus 130.

Figure 8:
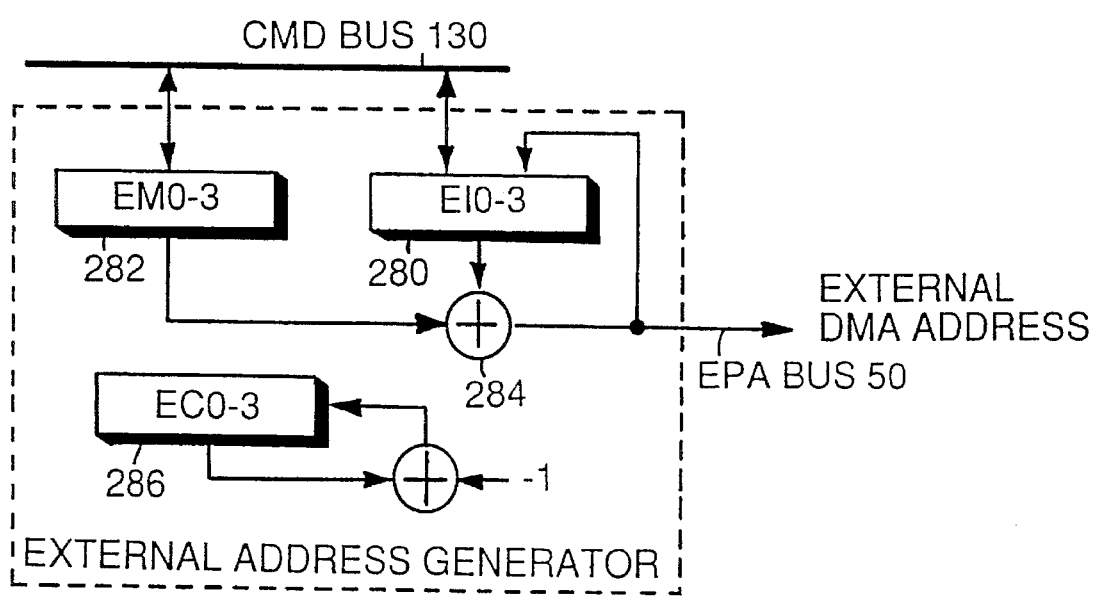
FIG. 8 is a block diagram of the external DMA address generators of FIG. 2.

The architecture of the external DMA address generators 252 is shown in FIG. 8. Each of the external DMA address generators is associated with one of the internal DMA address generators. Each channel contains an external index register 280 and an external modify register 282, which are connected to the CMD bus 130. The registers 280 and 282 are output through a summing unit 284 to the EPA bus 50. Each external DMA address generator 252 also includes an external count register 286. The registers in the external DMA address generator are used to generate addresses for the external port in the same way that the index register 260, modify register 262 and count register 266 generate addresses for the internal memory. The registers 280, 282 and 286 are used during transfers between internal memory and external memory or devices. The external count register 286 is loaded with the number of external bus transfers that should occur. This differs from the number of words transferred by the DMA controller if packing is used.

The external port circuit 102 communicates with the DMA controller 100 via an internal DMA request/grant handshake. Each port has one or more DMA channels, with each channel having a single request line and a single grant line. When a particular external port wishes to write data to internal memory, it asserts its request line. This request is prioritized with all other valid DMA requests. When a channel becomes the highest priority requester, its grant line is asserted by the DMA controller. In the next clock cycle, the DMA transfer is started.

Since more than one channel may have a request active in a particular cycle, a prioritization scheme is used to select the channel to service. Fixed prioritization is used except for the external port DMA channels. In general, serial ports have the highest priority, chain loading requests have second priority, external direct access to internal memory has third priority, link ports have fourth priority and external ports have lowest priority. It is noted that external direct access to internal memory and chaining are given a place in the DMA channel priority list, since these accesses are performed over the DM bus 32 during the second clock phase.

Each of the chain pointer registers 274 points to a buffer in internal memory called a transfer control block which contains the channel parameters for the next DMA sequence. A DMA sequence is defined as the sum of the DMA transfers for a single channel from the channel initialization until the channel count reaches 0. When a DMA channel finishes a sequence, the DMA controller retrieves the transfer control block from internal memory and loads it into its DMA channel registers, setting up that channel for another DMA sequence. This process is called DMA chaining.

A working register 278 is loaded from the chain pointer register 274 before the chain loading begins, and is decremented after each register is loaded. The working register 278 allows the chain pointer (CP) register 274 to be updated with a new CP value without interfering with the current register loading. When the loading is complete, the working register 278 is loaded with a new CP value. This allows a user to chain DMA sequences in a continuous loop. As noted above, the DMA controller 100 preferably includes 10 DMA channels. Of the 10 DMA channels, some are dedicated to certain functions, while others can be assigned to different functions. In a preferred embodiment, DMA channels 0 and 2 are dedicated to serial port 0 for receiving and transmitting, respectively. DMA channel 1 is shared by serial port 1 transmit and link buffer 0. DMA channel 3 is shared by serial port 1 receive and link buffer 1. DMA channels 4 and 5 are dedicated to link buffers 2 and 3, respectively. DMA channel 6 is shared by external port buffer 0 and link buffer 4. DMA channel 7 is shared by external port buffer 1 and link buffer 5. DMA channels 8 and 9 are dedicated to external port buffers 2 and 3, respectively. Separate transmit and receive DMA channels are provided for each serial port.

The link buffers 114 (FIG. 2) function as two location FIFO buffers. If the core processor 12 attempts to read an empty link buffer, the access is held up and the core processor will stall until the buffer receives data from the external link port. If the core processor attempts to write a full link buffer, the access is held up and the core will stall until the buffer transmits data on the external link port.

Each external port DMA channel is associated with external port buffer 110 (FIG. 2). Each buffer functions as a six location FIFO buffer having a read port and a write port. Each port can be connected to the EPD bus 48 or to the DMD bus 40. This configuration allows data to be written to the buffer on one port, while it is being read from the other port, thereby allowing DMA transfer rates at the chip clock frequency.

Each external port buffer includes packing logic to allow 16-bit and 32-bit external words to be packed into 32-bit and 48-bit internal words. The packing logic is reversible, so that 32-bit and 48-bit internal words can be unpacked into 16-bit and 32-bit external words.

DMA transfers between internal memory 16 and external memory require that the DMA controller 100 generate addresses for both memories. Each external DMA address generator contains external index register 280 and external modify register 282 to perform external address generation. The index register 280 provides the external port address for the current external memory DMA cycle and is updated with the sum of the index and modify registers for the next external memory address.

Each external port DMA channel can be set up to operate as a DMA master or a DMA slave. A DMA master initiates external memory cycles, while the DMA slave responds to external memory cycles initiated by another device. In the DMA master mode, the DMA controller internally generates DMA requests for that channel until the DMA sequence is completed. Examples of DMA master mode operations include transfers between internal memory and external memory, and transfers from internal memory to external devices.

In the DMA slave mode, a particular DMA channel cannot independently initiate external memory cycles. To initiate a DMA transfer in slave mode, an external device must either read or write the corresponding external port buffer (called memory-mapped DMA), or assert the DMARx line (called handshake DMA).

External devices perform DMA transfers to internal memory 16 of the DSP 10 by accessing the corresponding memory-mapped DMA buffer. Consider the case where an external device wishes to transfer a block of data into the memory 16. First, the external device writes to DMA channel setup registers in the IOP registers to initialize the DMA channel. Then, the device begins writing to the DMA buffer 110. When the buffer 110 contains a valid data word, the external port buffer signals the DMA channel to request an internal DMA cycle. When granted, the internal DMA cycle occurs, and the DMA buffer is emptied. If the internal DMA cycle is held off for some reason, the external device can still write to the DMA buffer 110 because of the six deep FIFO buffer in each DMA channel. Eventually, when that channel buffer is full, the acknowledge line, ACK, is deasserted and the external device access is held off. This state will persist until the internal DMA cycle is finally completed and space is freed in the DMA buffer.

Now consider the case where the transfer direction is from internal memory to the external port. Immediately after the DMA channel is enabled, it requests internal DMA cycles to fill the external port buffer 110. When the buffer is filled, the request is deasserted. When the external device reads the external port buffer, it becomes partially empty and the internal DMA request will be asserted again. If the DMA controller cannot fill the DMA buffer at the same rate as the external port empties it, then the external port acknowledge line, ACK, will be deasserted, holding off the external access until data becomes valid in the external port buffer 110.

External port buffers 1 and 2 are each equipped with two external lines: DMA request, DMAR(1:2), and DMA grant, DMAG(1:2). These signals are used to perform a hardware handshake to facilitate DMA transfers between the DSP 10 and an external peripheral device which does not have bus master capability. The DMA handshake operates asynchronously at up to the full clock speed of the DSP.

Figure 9:
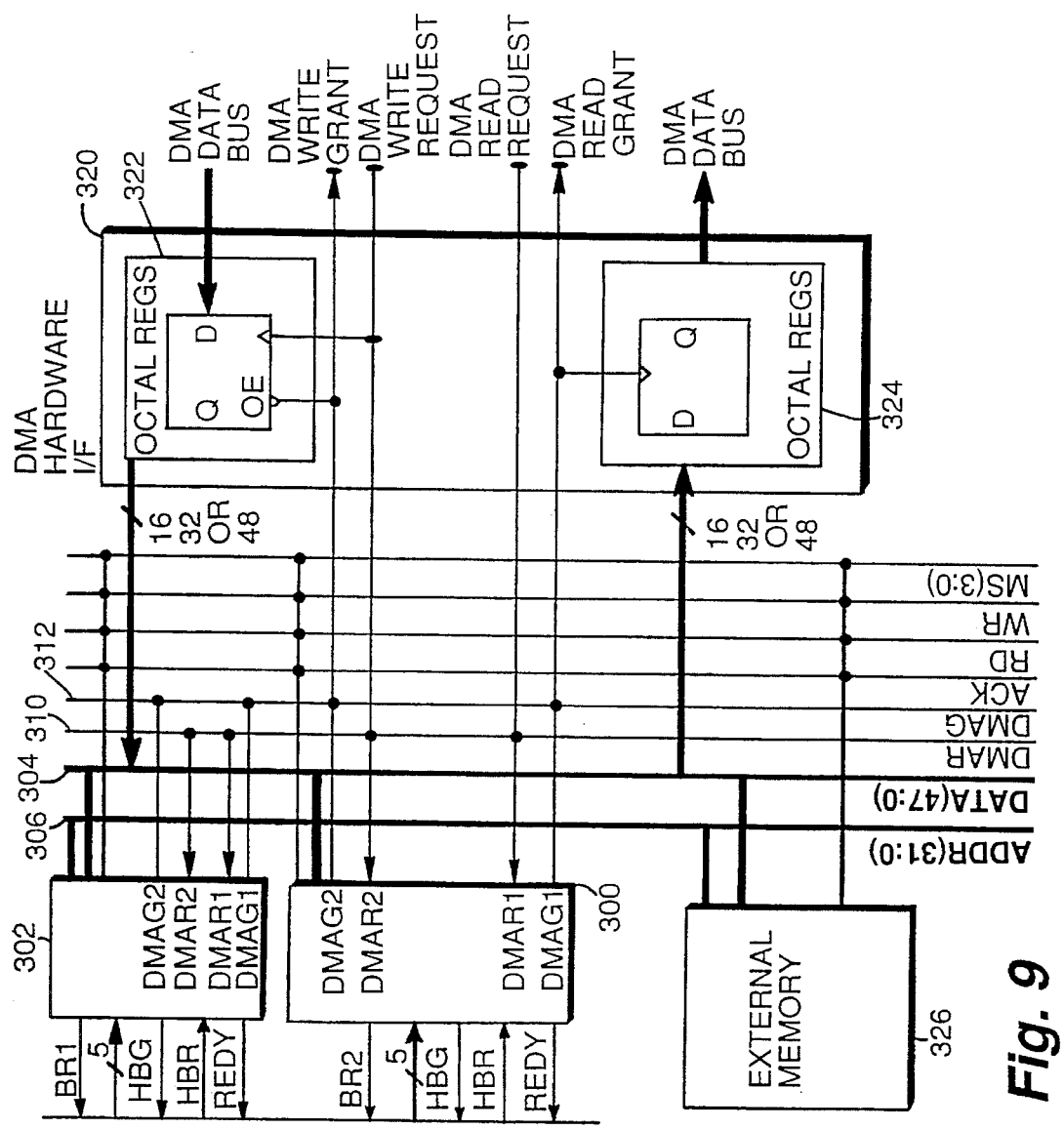
FIG. 9 is a block diagram of a system for performing DMA transfers to and from the digital signal processor.

An example of a DMA configuration is shown in FIG. 9. A first DSP 300 and a second DSP 302 are connected to an external data bus 304 and an external address bus 306 in a multiprocessor configuration similar to that shown in FIG. 5 and described above. DSP's 300 and 302 correspond to the DSP 10 shown in FIG. 1. The system may include an external memory 326 connected to external buses 304 and 306 and the external control lines. The DMARx lines of each DSP are connected to an external DMAR line 310, and the DMAGx lines of each DSP are connected to an external DMAG line 312 (where x represents the DMAR or DMAG line number). A DMA device 320 includes octal registers 322 connected to data bus 304 for DMA transfer to the DSP's 300 and 302, and octal registers 324 connected to data bus 304 for DMA transfer from DSP's 300 and 302. Alternatively, the registers 322 and 324 can be FIFO buffers. The external DMAR line 310 is connected to the clock inputs of the octal registers 322, and the external DMAG line 312 is connected to the output enable inputs of the octal registers 322. The external DMAG line 312 is also connected to the clock inputs of the octal registers 324. Thus, the DMAR and DMAG lines are used to directly control the octal registers 322 and 324 during DMA transfer. Since the registers 322 and 324 are controlled by the DMAR and DMAG signals from the DSP's 300 and 302, each DMA transfer can be completed in a single bus cycle of the DSP's, even if the DMA device 320 operates more slowly than the DSP's. As a result, traffic on external buses 304 and 306 is reduced, and system performance is improved.

Figure 10:
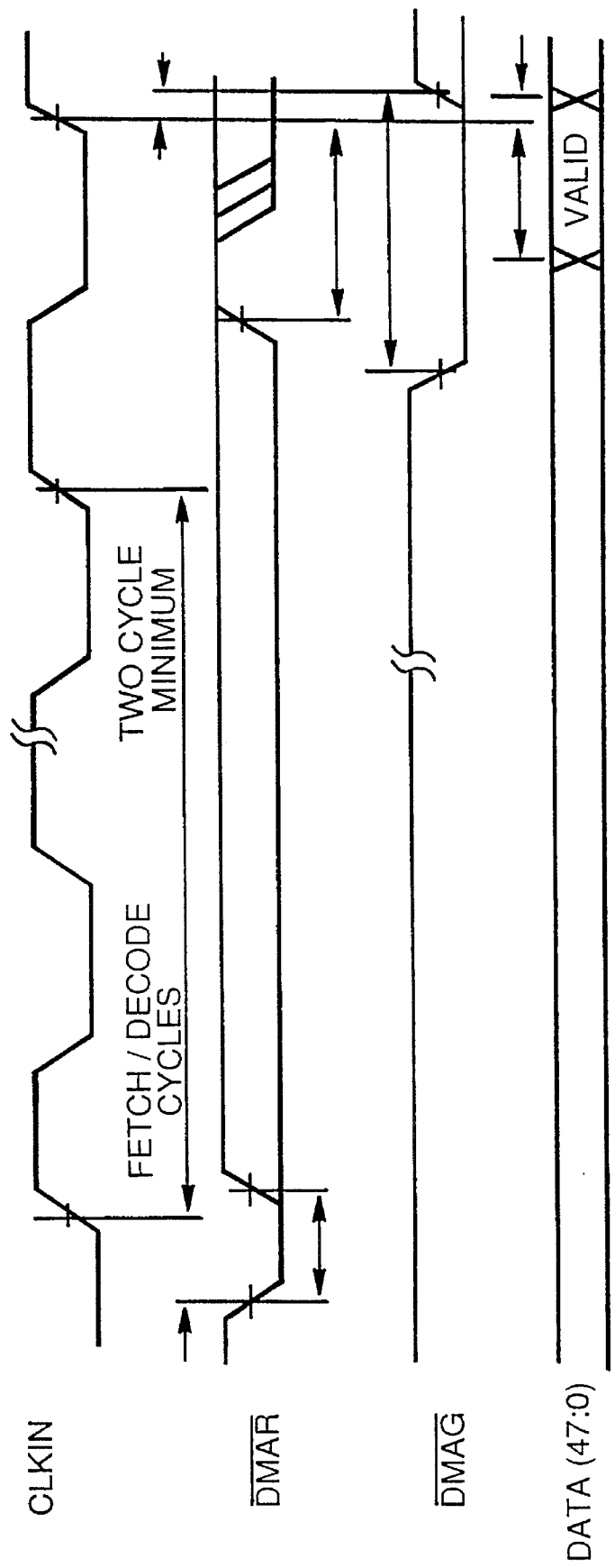
FIGS. 10 and 11 are timing diagrams that illustrate the timing of DMA transfers with the digital signal processor.
Figure 11:
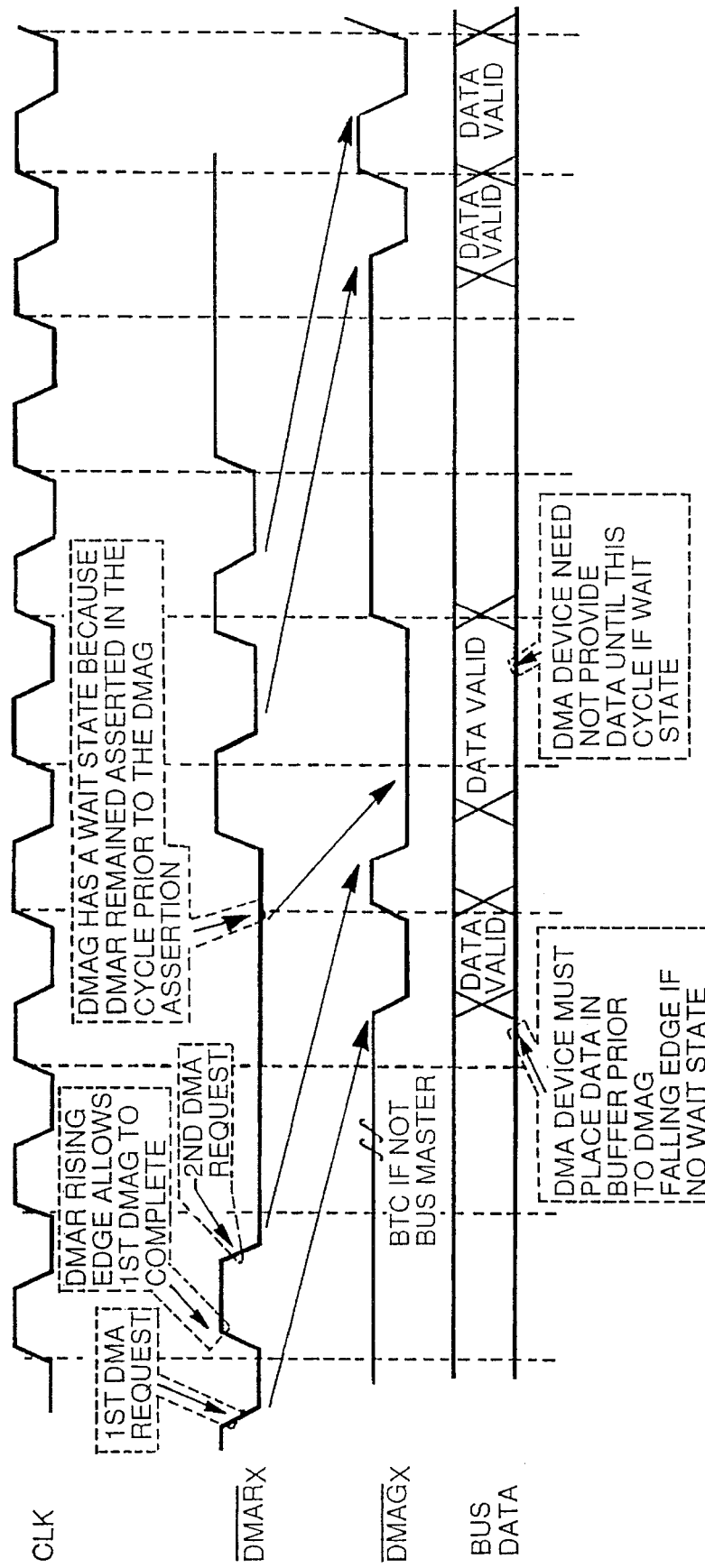

Reference is now made to FIGS. 10 and 11, which illustrate DMA timing. The DMA handshake uses the rising and falling edges of the DMARx signal. The DSP interprets a falling edge as meaning "begin DMA access" and interprets a rising edge as meaning "complete the DMA access". To request an access of the external port buffer, the external device pulls DMARx low. The falling edge is detected by the DSP and is synchronized to the system clock. When the DSP recognizes the request, it begins to arbitrate for the external bus, if it is not already the bus master or if the buffer is not blocked. When the DSP becomes the bus master it drives DMAGx low. The DSP will keep DMAGx asserted until DMARx is deasserted. This allows the external device to hold the DSP in a wait state until it is ready to proceed. If the external device does not wish to extend the grant cycle, it can deassert DMARx immediately after asserting it, provided it meets minimum width requirements. In this case, DMAG will be a short pulse, and the external bus will only be used for one cycle.

The external device must make sure that, when the grant arrives, the data corresponding to each write request is immediately available or that it can accept each requested word for a read. Since the external device can control the completion of a request, it does not need to have data available before making a request. However, if the data is not available within two cycles and the request line is keep low for this time, then the DSP and the external bus may be held inactive. The external bus is occupied for only one cycle for each DMA transfer if the request is deasserted before the grant has been asserted. Otherwise, the external bus is held as long as DMARx is asserted.

The DSP also supports data transfers between an external device and external memory using the DMA handshake lines DMARx and DMAGx. External transfers require the external port DMA channel to generate external memory cycles. Instead of simply outputting DMAGx, the DSP also outputs address, memory selects and strobes to initiate an external memory access. The external memory access behaves exactly as if the DSP core processor had requested it. The EI register 280, the EM register 282 and the EC register 286 (FIG. 8) specify the external memory space and must be loaded. The DMARx and DMAGx lines function as described above. The DMA buffer in the DSP does not latch or drive the data. No internal DMA cycles are generated by external transfers.

In an alternative DMA handshake scheme, a DMA request signal, DMAR, a DMA grant signal, DMAG, and a DMA hold signal, DMAH, are used. The DMA hold signal is used to place the DMA transfer in a wait state. Requests are asserted on the falling edge of the DMA request signal. The DMA grant signal stays low if DMAH is asserted. The benefit of the DMA hold signal is that several requests can be made without concern for whether the data is ready. The DMA hold signal can then be asserted at any time the data buffer is empty (for write to the DSP) or full (for read from the DSP). The disadvantage is that DMAH requires an additional I/O pin on the integrated circuit.

Master and handshake bits in a control and status register for each external port DMA channel in combination provide four DMA transfer modes. (1) Slave mode with no handshake. The DMA request is generated whenever the receive buffer is not empty or the transmit buffer is not full. (2) Slave mode with handshake (channels 1 and 2 only). The DMA request is generated when the DMARx line is asserted. The transfer occurs when DMAGx is asserted. (3) Master mode without handshake. The DMA channel will attempt a transfer whenever the receive buffer is not empty or the transmit buffer is not full and the DMA counter is non-zero. (4) Modified master mode with the request being generated when DMARx is asserted (channels 1 and 2 only). The bus transfer occurs when memory read strobe, RD, or memory write strobe, WR, is asserted. The address is driven as in normal master mode. DMAGx is not active in this mode. This allows the same external buffer to be used for both core processor accesses and DMA. DMARx requests operate in the same way as in handshake mode.

In the two dimensional DMA mode, two dimensional DMA array addressing may be performed for link ports and serial ports. Two DMA channels are available for the link ports and two for a serial port, for a total of 4 two-dimensional DMA channels. Referring again to FIG. 7, the index register 260 is loaded with the first address in the data array and maintains the current address by subtracting the X increment after each transfer. The X increment register 262 contains the offset added to the current address to point the next element in the X dimension (next column). The X initial count register 270 contains the number of data elements in the X dimension. This is used to reload the X count register when it decrements to 0. The X count register 266 contains the number of data elements left in the current row. This initially has the same value as X initial count. It is decremented after each transfer. The Y increment register 272 contains the offset added to the current address to point to the next element in the Y dimension (first location in the next row). When the X count register reaches 0, this register is added to the current address in the following cycle, and the Y count register is decremented. The value of register 272 should be the row distance minus the column distance since both the X and Y increments are done on a row change. Two DMA cycles are required for a row change. The Y count register 276 initially contains the number of data elements in the Y dimension (number of rows). It is decremented each time the X count register reaches 0. When the Y count reaches 0, the DMA block transfer is done. The next pointer register 274 points to the start of a buffer in internal memory containing the next DMA setup parameters.

In a preferred embodiment, the DSP 10 includes six link ports that provide high speed, point-to-point- point data transfers to other DSP's and external devices that follow the link port protocol. The link ports allow a variety of interconnection schemes between multiple DSP's and external devices, including one, two and three dimensional arrays. Each link port may either transmit or receive and is supported by a DMA channel. The link ports operate independently of each other, except when used in mesh multiprocessing operations.

Each link port includes four bidirectional data lines, LxDAT (3:0) and two handshake lines, link clock (LxCLK), and link acknowledge (LxACK), where x represents the link port number. The link clock LxCLK allows asynchronous data transfers, and link acknowledge LxCLK allows handshaking. The transmitter drives the data lines and the link clock line, while the receiver drives the link acknowledge line.

Figure 12:
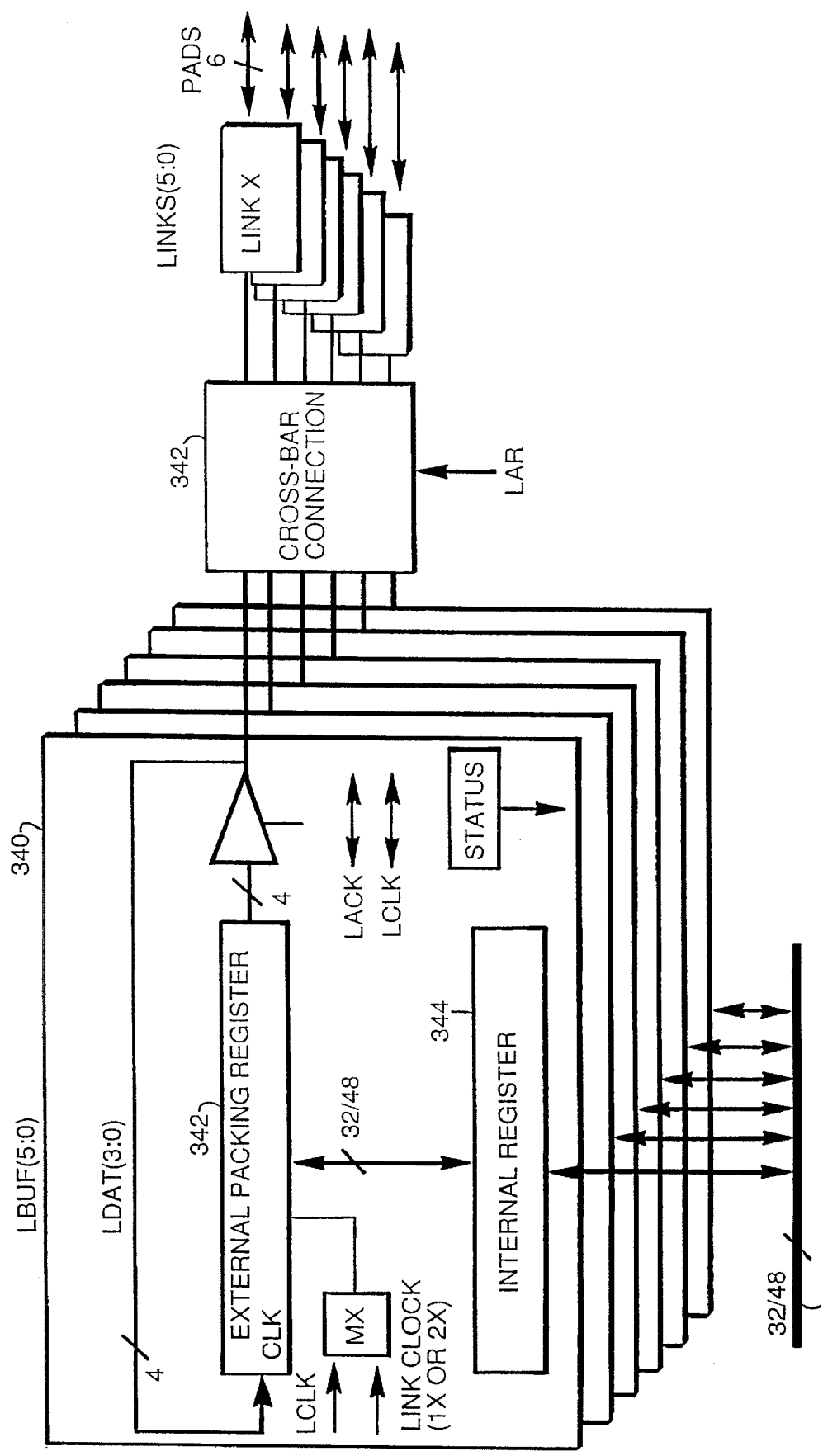
FIG. 12 is a block diagram that illustrates the link port buffers and the link ports.

Each link port may be selected to transmit or receive from one of six link buffers 340 as shown in FIG. 12. The buffers read from or write to internal memory under DMA control on the PMD bus 44 during the first clock phase. Any link buffer 340 may be mapped to any link port in a link assignment register, which is represented in FIG. 12 as a crossbar connection 342. The link buffers 340 are supported by DMA channels. Each link port is assigned to a link buffer by a three bit field in the link assignment register. The link assignment register may be considered as performing a logical (link buffer) to physical (link port) mapping. Each link buffer 340 includes an external register 342 and an internal register 344. When transmitting, the internal register 344 is used to accept the DMA data from internal memory. The external register 342 performs the unpacking for the link port. These two registers form a two stage FIFO buffer that corresponds to the FIFO buffer 114 shown in FIG. 2. Two words can be written into the register before it signals a full condition. As each word is unpacked and transmitted, the next location in the FIFO buffer becomes available and a new DMA request is made. If the register becomes empty, the link clock LxCLK is deasserted. During receiving, the external register 342 is used to pack the receive port data and pass it to the internal register 344 before the transfer to internal memory. If the DMA transfer does not occur before both locations are filled, then link acknowledge LxACK will be deasserted.

Figure 13:
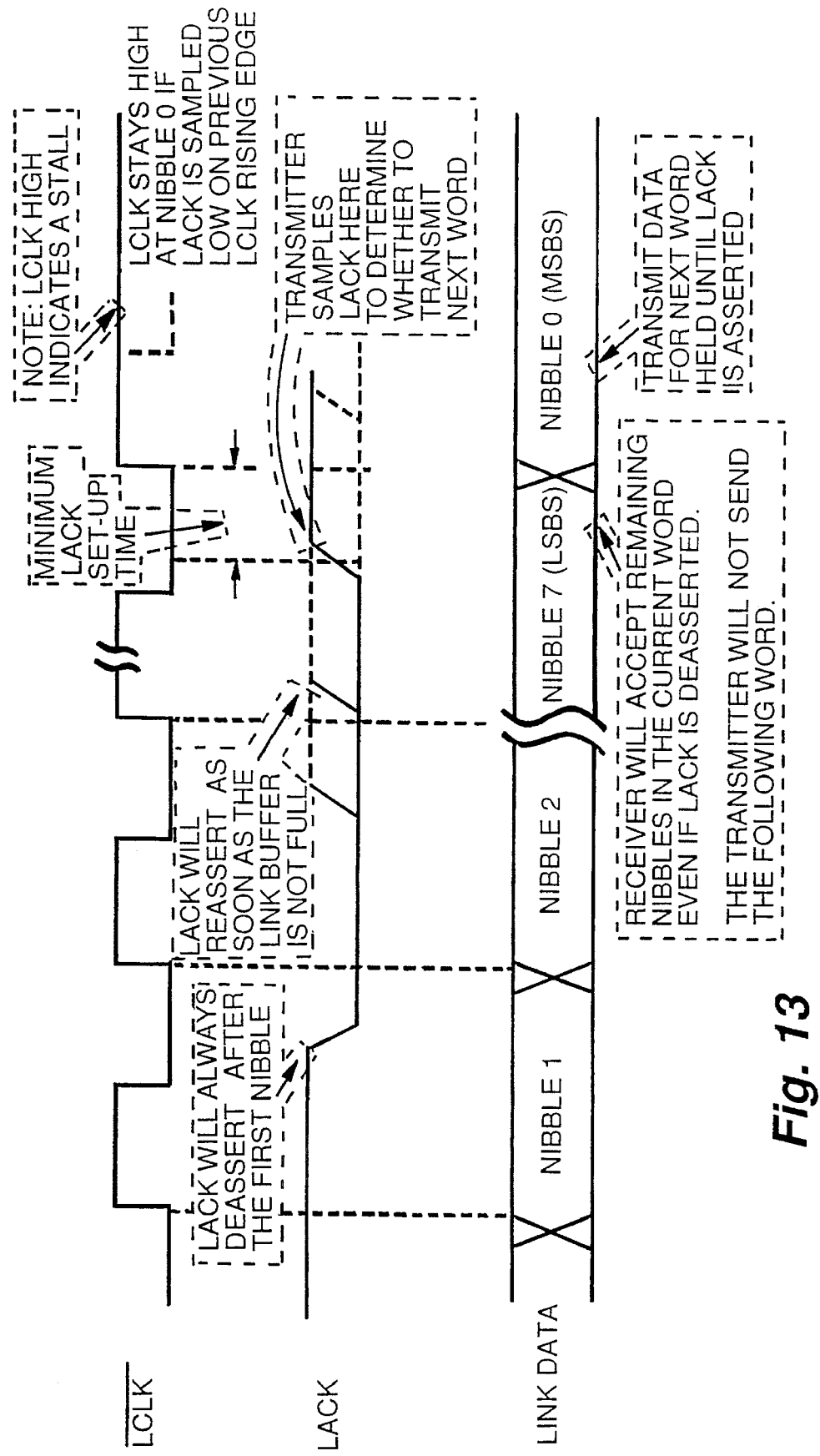
FIG. 13 is a timing diagram that illustrates the timing of link port operation.

The link clock LxCLK and link acknowledge LxACK of each link port allow handshaking for asynchronous data communication between DSP's. Other devices that follow the same protocol may also communicate with the link ports. A link port transmitted word includes 8 nibbles for a 32-bit word or 12 nibbles for a 48-bit word. The transmitter asserts the link clock LxCLK high with each new nibble of data, as shown in FIG. 13. The falling edge of link clock LxCLK is used by the receiver to clock in the nibble. The receiver asserts link acknowledge LxACK when another word can be accepted in the buffer. The transmitter samples link acknowledge LxACK at the beginning of each word transmission, i.e. after every 8 or 12 nibbles. If link acknowledge LxACK is deasserted at that time, the transmitter will not transmit the new word. The transmitter will leave the link clock LxCLK high if link acknowledge LxACK is deasserted. When link acknowledge LxACK is eventually asserted again, the link clock LxCLK will go low and proceed with the next word transmission. Data is latched in the receive buffer on the link clock LxCLK falling edge. A nibble transfer may occur in each clock cycle or twice per clock cycle if the link clock "times two" bit is set. As shown in FIG. 12, link port transfers may occur at the clock frequency or at twice the clock frequency.

As shown in FIG. 13, link acknowledge LxACK is deasserted after the first nibble is received and is reasserted as soon as the receiver link buffer is not full. The receiver will accept the remaining nibbles of the data word being transmitted, even if link acknowledge LxACK is deasserted during transmission of the data word. The transmitter samples link acknowledge LxACK after transmission of the last nibble of each data word, and the next data word is not transmitted until link acknowledge LxACK is asserted. Thus, link acknowledge LxACK controls transmission on word boundaries, and an acknowledge is not required for each nibble. As a result, transmission on the link ports can proceed at the link clock frequency, with no dead clock cycles between nibbles and no dead clock cycles between words.

Filtering is preferably used on the link data lines LxDAT (3:0) and the link clock line LxCLK. Filtering is possible because the link ports are self-synchronized, i.e. the clock and data are sent together. Thus, the relative delay between clock and data, rather than absolute delay, determines performance margin. By filtering the clock and data lines with identical circuits, the response to link clock noise and reflections is reduced, but the relative delay is unaffected. The filter has the effect of ignoring a full amplitude pulse that is narrower than about 2 nanoseconds. Pulses that are not full amplitude can be somewhat wider.

As a further feature of the link ports, the link clock and link acknowledge lines can be used for signaling between DSP's in accordance with a prearranged protocol. For example, signaling on the clock and acknowledge lines can be used to set up a DMA transfer without communication on the external bus of the multiprocessor system.

An LCOM register contains status bits for each link buffer as well as an error bit for each link port. The error bits reflect the status of the receive link port packer for each link buffer. A pack counter is loaded with the number of nibbles to be received and is decremented after each nibble is received. The error bit is low if the pack counter is 0, and otherwise is high. If the error bit is high at the end of a transmission, then an error occurred during the transmission. To make use of the error bit, one additional dummy word should be transmitted at the end of a block transmission. The transmitter then deselects the link port to allow the receiver to send an appropriate message back to the transmitter. When the receiver has received the data block, it checks to confirm that an additional word was received in the link buffer receiver, then clears the link buffer and transmits the appropriate message back to the transmitter on the same link port.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A digital signal processor, comprising:

a core processor for performing digital signal computations;

an I/O processor for controlling external access to and from the digital signal processor;

first and second pipeline memory banks for storing instructions and data for the digital signal computations;

a first bus and a second bus interconnecting said core processor and said first and second pipeline memory banks, said first bus interconnecting said I/O processor and said first and second pipeline memory banks;

an external port bus interconnecting said core processor and said I/O processor;

an external port circuit for interconnecting said external port bus to an external bus, said external bus providing interconnection to an external device, whereby said I/O processor communicates with said external device on said external port bus without interfering with access by said core processor to said first and second pipeline memory banks on said first bus and said second bus;

a clock circuit for generating a first clock phase and a second clock phase in response to a clock signal; and means for coupling said core processor to one of said pipeline memory banks on said first bus during said second clock phase and for coupling said I/O processor to one of said pipeline memory banks on said first bus during said first clock phase, whereby said core processor and said I/O processor access said first and second pipeline memory banks on said first bus during different clock phases of a clock cycle.

2. A digital signal processor as defined in claim 1 wherein said I/O processor includes means for coupling data between said external port bus and said pipeline memory banks on said first bus during said first clock phase, whereby said external device accesses said pipeline memory banks without interfering with operation of said core processor.

3. A digital signal processor as defined in claim 1 wherein said I/O processor includes at least one data communication port and means for coupling data between said data communication port and said pipeline memory banks on said first bus during said first clock phase, whereby said data communication port accesses said pipeline memory banks without interfering with operation of said core processor.

4. A method for digital signal processing with a digital signal processor comprising a core processor for performing digital signal computations, an I/O processor for controlling external access to and from the digital signal processor and first and second pipeline memory banks for storing instructions and data for the digital signal computations, said method comprising the steps of:

interconnecting said core processor and said first and second pipeline memory banks on a first bus and a second bus, and interconnecting said I/O processor and said first and second pipeline memory banks on said first bus;

generating a first clock phase and a second clock phase in response to a clock signal;

coupling said core processor to one of said pipeline memory banks on said first bus during said second clock phase and coupling said I/O processor to one of said pipeline memory banks on said first bus during said first clock phase, whereby said core processor and said I/O processor access said first and said second pipeline memory banks on said first bus during different clock phases of a clock cycle;

interconnecting said I/O processor to an external device on an external port bus; and coupling data between said external port bus and said pipeline memory banks on said first bus during said first clock phase, whereby said external device accesses said pipeline memory banks without interfering with operation of said core processor.

5. A method as defined in claim 4 further including the step of coupling data between a data communication port and said pipeline memory banks on said first bus during said first clock phase, whereby said data communication port accesses said pipeline memory banks without interfering with operation of said core processor.

* * * * *